(12) United States Patent
Niisaka et al.

(10) Patent No.: US 11,962,731 B2
(45) Date of Patent: Apr. 16, 2024

(54) LIGHT EMITTING COMPONENT, OPTICAL WRITING DEVICE USING SAME, AND IMAGE FORMING APPARATUS

(71) Applicant: FUJIFILM Business Innovation Corp., Tokyo (JP)

(72) Inventors: Yusuke Niisaka, Ebina (JP); Masaki Sato, Ebina (JP); Seiji Ono, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 181 days.

(21) Appl. No.: 17/384,132

(22) Filed: Jul. 23, 2021

(65) Prior Publication Data

US 2022/0272223 A1 Aug. 25, 2022

(30) Foreign Application Priority Data

Feb. 19, 2021 (JP) .................................. 2021-025532

(51) Int. Cl.
*H04N 1/04* (2006.01)
*H04N 1/028* (2006.01)

(52) U.S. Cl.
CPC .............................. *H04N 1/02815* (2013.01)

(58) Field of Classification Search
CPC ................................................. H04N 1/02815
USPC .................................. 358/475, 509, 1.7, 1.8
See application file for complete search history.

(56) References Cited

U.S. PATENT DOCUMENTS

| 8,274,741 B2 * | 9/2012 | Koizumi | B41J 2/451 347/241 |
| 2010/0254723 A1 * | 10/2010 | Tanaka | G03G 15/55 347/256 |
| 2011/0123210 A1 * | 5/2011 | Nomura | B41J 2/451 399/51 |
| 2011/0129245 A1 * | 6/2011 | Sowa | B41J 2/45 399/51 |
| 2013/0250031 A1 | 9/2013 | Ohno | |

(Continued)

FOREIGN PATENT DOCUMENTS

| JP | 2007-237576 A | 9/2007 |
| JP | 2012-56123 A | 3/2012 |
| JP | 5862404 B2 | 2/2016 |

OTHER PUBLICATIONS

Search Report dated Feb. 22, 2022 by the European Patent Office in counterpart European Patent Application No. 21195271.8.

*Primary Examiner* — Cheukfan Lee
(74) *Attorney, Agent, or Firm* — Sughrue Mion, PLLC

(57) ABSTRACT

A light emitting component includes: a first light emitting element row including light emitting elements arranged in a main scanning direction; and a second light emitting element row including light emitting elements arranged in the main scanning direction such that the second light emitting element row is deviated from the first light emitting element row in a sub scanning direction and each of the light emitting elements in the second light emitting element row is positioned between light emitting elements adjacent to each other in the first light emitting element row, and a light emitting point area that is an area where each light emitting element of the first light emitting element row emits light, and a light emitting point area that is an area where each light emitting element of the second light emitting element row emits light are overlapped with each other in the main scanning direction.

14 Claims, 17 Drawing Sheets

(56) References Cited

U.S. PATENT DOCUMENTS

| 2019/0384205 | A1  | 12/2019 | Furuta |              |
|--------------|-----|---------|--------|--------------|
| 2022/0128922 | A1* | 4/2022  | Yagi   | G03G 15/04036 |
| 2022/0128923 | A1* | 4/2022  | Yagi   | G03G 15/04054 |
| 2023/0185212 | A1* | 6/2023  | Kondo  | G03G 15/04054 |
|              |     |         |        | 399/218      |

\* cited by examiner

IDEAL POSITION

DEVIATED CASE

LIGHT EMITTING COMPONENT, OPTICAL WRITING DEVICE USING SAME, AND IMAGE FORMING APPARATUS

CROSS-REFERENCE TO RELATED APPLICATIONS

This application is based on and claims priority under 35 USC 119 from Japanese Patent Application No. 2021-025532 filed on Feb. 19, 2021.

BACKGROUND

Technical Field

The present invention relates to a light emitting component, an optical writing device using the same, and an image forming apparatus.

Related Art

In the related art, as an image forming apparatus, a system of writing an image by light on a photoconductor or dielectric by an optical writing device is widely adopted.

As this kind of the optical writing device, for example, an optical writing device described in Japanese Patent No. 5862404 (see Detailed Description, and FIG. 4) is common.

Japanese Patent No. 5862404 provides a light emitting element array in which light emitting elements are arranged along a main scanning direction as a light emitting component used in an optical writing device. The light emitting element array is configured such that light emitting points of the light emitting elements are not aligned in one row in the main scanning direction, but are aligned in two rows in a staggered manner.

SUMMARY

Aspects of non-limiting embodiments of the present disclosure relate to providing: a light emitting component in which an arrangement interval of adjacent light emitting points of light emitting elements adjacent to each other and being arranged in a main scanning direction may be narrowed while ensuring the light emitting area of the light emitting elements arranged in the main scanning direction; and an optical writing device using the same, and an image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light emitting component including: a first light emitting element row including light emitting elements arranged in a main scanning direction; and a second light emitting element row including light emitting elements arranged in the main scanning direction such that the second light emitting element row is deviated from the first light emitting element row in a sub scanning direction and each of the light emitting elements in the second light emitting element row is positioned between light emitting elements adjacent to each other in the first light emitting element row, in which a light emitting point area that is an area where each light emitting element of the first light emitting element row emits light, and a light emitting point area that is an area where each light emitting element of the second light emitting element row emits light are overlapped with each other in the main scanning direction.

BRIEF DESCRIPTION OF THE DRAWINGS

Exemplary embodiment(s) of the present invention will be described in detail based on the following figures, wherein.

DETAILED DESCRIPTION (Overview of Exemplary Embodiment)

Figure 1A:
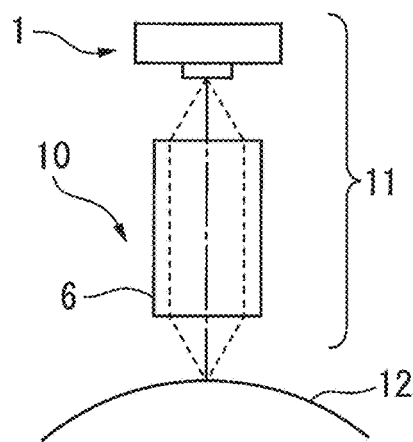
FIG. 1A illustrates an outline of an image forming apparatus according to an exemplary embodiment.

FIG. 1A illustrates an outline of an image forming apparatus according to an exemplary embodiment.

In FIG. 1A, an image forming apparatus 10 includes an optical writing device 11 and an image carrying unit 12 that is provided to face the optical writing device 11 and carries an image based on light written by the optical writing device 11.

Here, the optical writing device 11 includes a light emitting component 1 and an imaging unit 6 that forms an image based on light emitted from each light emitting element 4 in the light emitting component 1 on the image carrying unit 12 capable of carrying an image based on light. The optical writing device 11 writes the image based on light on the image carrying unit 12.

Here, the image carrying unit 12 is not limited to a photoconductor, and examples thereof may include a dielectric and the like, and a form thereof may be appropriately selected from a drum shape, a belt shape, and the like. Examples of the image based on light include an electrostatic latent image formed with a potential difference by charging to a preset level and then removing static electricity with light corresponding to an image pattern.

In addition, as the imaging unit 6, a lens (for example, a cylindrical lens) that refracts light on the surface, a lens (for example, a gradient index lens) that refracts light inside, or the like may be appropriately selected as long as an image based on light emitted from each light emitting element 4 in the light emitting component 1 is formed on the image carrying unit 12.

Figure 1B:
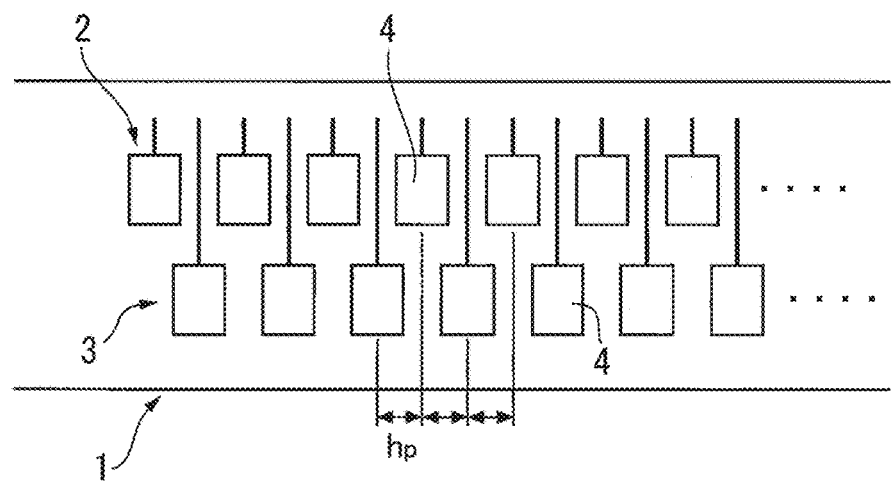
FIG. 1B is an explanatory diagram illustrating a configuration example of a light emitting component used in FIG. 1A.
Figure 1C:
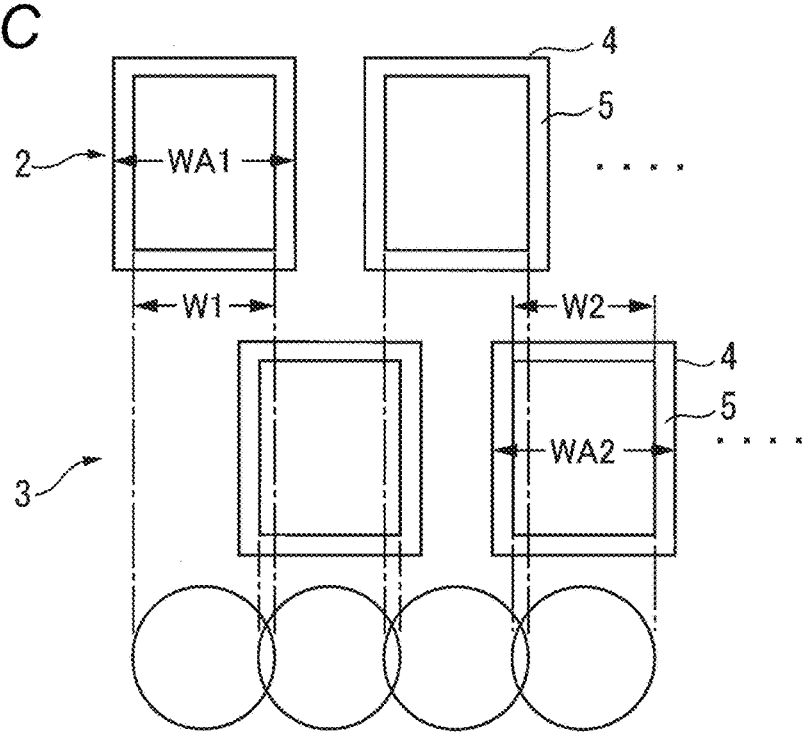
FIG. 1C is an explanatory diagram of the light emitting component.

As illustrated in FIG. 1B, the light emitting component 1 includes a first light emitting element row 2 including light emitting elements 4 arranged in a main scanning direction, and a second light emitting element row 3 including light emitting elements 4 arranged such that the second light emitting element row is deviated from the first light emitting element row in a sub scanning direction and each of the light emitting elements in the second light emitting element row is positioned between light emitting elements 4 adjacent to each other in the first light emitting element row 2. As illustrated in FIG. 1C, a light emitting point area WA1 that is an area where each light emitting element 4 of the first light emitting element row 2 emits light, and a light emitting point area WA2 that is an area where each light emitting element 4 of the second light emitting element row 3 emits light are overlapped with each other in the main scanning direction.

Here, examples of the light emitting element 4 include a light emitting diode (LED). In this case, a specific configuration of the light emitting element 4 is a configuration in which a p-anode layer, a light emitting layer, and an n-cathode layer, each constituting the light emitting diode LED, are stacked, and grooves are formed in the stacked layers such that the light emitting elements 4 serve as separate light emitting points. In the exemplary embodiment, the light emitting point areas WA1 and WA2 have the same width as the cathode layer of the light emitting diode LED, but the present invention is not limited to this, and the light emitting diode may be configured such that light is emitted in a narrower area by a current confinement layer provided in the p-anode layer.

The light emitting element 4 is not limited to an LED, and may be a vertical cavity surface emitting laser (VCSEL) or the like.

In such technical units, since the exemplary embodiment may not be realized only by disposing the light emitting elements 4 in one row in the main scanning direction, it is assumed that the first light emitting element row 2 and the second light emitting element row 3 are included. The present invention is not limited to the exemplary embodiment in which the first light emitting element row 2 and the second light emitting element row 3 are arranged in a staggered manner, and an exemplary embodiment in which a third light emitting element row (not illustrated) is further included is also assumed.

In the exemplary embodiment, when the light emitting component 1 of the optical writing device 11 writes an image in a manner of dividing the image into plural lines, movement in a line direction is referred to as main scanning, and movement in a next line direction is referred to as sub scanning.

Each of the first light emitting element row 2 and the second light emitting element row 3 is typically arranged in a straight line along the main scanning direction, but may not be arranged in a straight line. For example, in an exemplary embodiment in which a light emitting element array including the first light emitting element row 2 and the second light emitting element row 3 includes plural light emitting element chips, and the plural light emitting element chips are arranged, for example, in a staggered manner, the first light emitting element row 2 and the second light emitting element row 3 in in odd-numbered light emitting element chips and the first light emitting element row 2 and the second light emitting element row 3 in even-numbered light emitting element chips are not aligned on a straight line, respectively, but the exemplary embodiment is also included.

Further, in a case where a linear image is formed by using the first light emitting element row 2 and the second light emitting element row 3 in the light emitting component 1, for example, a delay circuit may be used or an image writing timing may be appropriately shifted for drawing in consideration of a moving speed of the image carrying unit 12 in the sub scanning direction and an arrangement pitch of the first light emitting element row 2 and the second light emitting element row 3 in the sub scanning direction. In an exemplary embodiment in which plural light emitting element chips are used, an image writing timing based on the odd-numbered light emitting element rows and the even-numbered light emitting element rows may be adjusted in consideration of an arrangement pitch of the light emitting element chips in the sub scanning direction.

In the exemplary embodiment, as illustrated in FIG. 1C, an electrode 5 through which light does not pass is disposed on a surface of each light emitting element 4 of the first light emitting element row 2 and second light emitting element row 3. For this reason, in the exemplary embodiment, an area surrounded by the electrode 5 is a light emitting beam area from which light emitted from the light emitting element 4 is emitted toward an object. A light emitting beam area W1 of each light emitting element 4 of the first light emitting element row 2 and a light emitting beam area W2 of each light emitting element 4 of the second light emitting element row 3 are arranged such that there is no gap in the main scanning direction between the light emitting beam area W1 and the light emitting beam area W2.

In addition, the light emitting point area and the light emitting beam area are determined by a width dimension for separating a light emitting portion island from a multilayer structure of the light emitting element 4, a width dimension for an etching process, or a size ensured as an opening portion from which light is emitted and that is determined by subtracting an electrode width.

In this way, by devising the arrangement of the light emitting elements 4 in the light emitting component 1 in the main scanning direction, an image formed on the image carrying unit 12 by the imaging unit 6 becomes an image based on a beam corresponding to a light emitting point of each light emitting element 4 in the light emitting component 1.

Next, the light emitting component according to the exemplary embodiments is described.

First, as a typical method of selecting the arrangement pitch of the light emitting points of the first light emitting element row 2 and the second light emitting element row 3, an arrangement pitch hp along the main scanning direction between the light emitting points of the respective light emitting elements 4 of the first light emitting element row 2 and the light emitting points of the respective light emitting elements 4 of the second light emitting element row 3 is equal to or less than ½ of the arrangement pitch in the main scanning direction between the light emitting points of the light emitting elements 4 adjacent to each other in each of the first light emitting element row 2 and second light emitting element row 3.

Here, in an exemplary embodiment in which the light emitting component 1 includes only the first light emitting element row 2 and second light emitting element row 3, the arrangement pitch is ½ at maximum, but in an exemplary embodiment in which a third light emitting element row (not illustrated) is added in addition to the first light emitting element row 2 and second light emitting element row 3, for example, the arrangement pitch may be less than ½.

As the arrangement of the light emitting points in the main scanning direction in an exemplary embodiment, example thereof include an exemplary embodiment in which the light emitting point area of the light emitting element 4 of the first light emitting element row 2 and the adjacent light emitting point area of the light emitting element of the second light emitting element row 3 are overlapped with each other in a range of 30% to 70% in the main scanning direction. This is because, it is found from the result of the simulation that when the overlap is too large, the influence for the improvement of the resolution is small even though the resolution is intentionally increased by shifting in the sub scanning direction, and when the arrangement is made in two rows in the sub scanning direction, the wiring and a space between the light emitting element and the light emitting element may not be sufficiently ensured and the current state becomes unstable, and when the arrangement is made in at least three rows, the size of the light emitting device is increased in the sub scanning direction, and such problems are likely to occur when the overlap exceeds 65%; and on the other hand, when the overlap is too small, a sufficient light emitting point area may not be ensured and a light amount may be insufficient when the overlap is less than 30%.

In the case of FIG. 1C, since the light emitting elements are arranged at 2400 dpi, an interval between the light emitting element 4 of the first light emitting element row 2 and the light emitting element 4 of the second light emitting element row 3 is 10.5 µm. Since a width of the cathode layer of the light emitting element is set to 15.4 µm, two adjacent light emitting elements 4 in the second row are overlapped with one light emitting element 4 in the first row, and thus an overlapping area is 63.6%. It should be noted that, as for the reason for setting an appropriate value to the side where the degree of the overlap is large instead of the median value, in the exemplary embodiment, this is related to the fact that the electrode is disposed so as to surround the light emitted from the light emitting point area in the exemplary embodiment.

In addition, as illustrated in FIG. 1C, a dimension of a part surrounded by the electrode in the case where the electrode 5 is disposed is 10.6 µm, that is substantially equal to the pitch of 2400 dpi. Although light is emitted from the entire region of the light emitting point area of the light emitting element 4, light is emitted so as to form the distribution in which a light amount near a side surface is weak and a light amount in a central portion is strong. It may also be said that the light emitting point areas are made wider with respect to the pitch so as to increase the overlap, and a portion where a stable light amount is obtained by the electrode 5 is extracted. In a case where the width is set to be smaller than the pitch, when the interval is narrow such as the case of 2400 dpi or more, there is a high possibility that the light amount is insufficient, and a state in which there is a slight overlap may be set instead of the overlap of 0, i.e. there is just no gap. However, from the viewpoint of resolution, the overlap may be within 10%.

Further, as the arrangement of the light emitting points in the sub scanning direction in an exemplary embodiment, examples thereof include an exemplary embodiment in which an arrangement pitch along the sub scanning direction between the light emitting point of the respective light emitting element 4 of the first light emitting element row 2 and the light emitting point of the respective light emitting element 4 of the second light emitting element row 3 is an integer N times an image forming line interval. According to this exemplary embodiment, by selecting the integer N times the image forming line interval, an image of the same line may be written by the first light emitting element row 2 and the second light emitting element row 3 by shifting a writing timing by N lines.

In addition, as the imaging unit 6 of the optical writing device 11 in an exemplary embodiment, examples thereof include a configuration in which gradient index lenses each having a diameter larger than a distance in the sub scanning direction between the first light emitting element row 2 and the second light emitting element row 3 are arranged in the main scanning direction. In the exemplary embodiment, a gradient index lens is used as the imaging unit 6, and light from each light emitting element 4 of the first light emitting element row 2 and second light emitting element row 3 enters the same gradient index lens.

Here, in the exemplary embodiment in which the gradient index lens is used as the imaging unit 6, a position where light emitted from the first light emitting element row 2 enters the gradient index lens may be different from a position where light emitted from the second light emitting element row 3 enters the gradient index lens in the sub scanning direction.

In addition, plural light emitting element chips (not illustrated) each including the first light emitting element row 2 and the second light emitting element row 3 may be included, the plural light emitting element chips may be disposed such that each of the plural light emitting element chips may be deviated from each other in the sub scanning direction and the main scanning direction, the imaging unit 6 may be configured such that the gradient index lenses are arranged in plural rows adjacent to each other in the main scanning direction, and light from each light emitting element 4 in one light emitting element chip may enters gradient index lenses in a row arranged in the main scanning direction, and light from each light emitting element 4 in an adjacent light emitting element chip may enter gradient index lenses in a different row. In the exemplary embodiment in which plural light emitting element chips are arranged in a deviated manner and gradient index lenses in plural rows are used, the gradient index lenses in plural rows are assigned to the optical paths from each of the light emitting element chips deviated from each other. In a case where the light emitted from both the light emitting element chips is allowed to enter the gradient index lenses in the same row, a difference in the optical path length from both the light emitting element chips becomes large, and the imaging characteristics easily vary accordingly, but in the exemplary embodiment, such an influence is prevented.

Hereinafter, an exemplary embodiment according to the present invention will be described in more detail with reference to in the accompanying drawings.

First Exemplary Embodiment

<Overall Configuration of Image Forming Apparatus>

Figure 2:
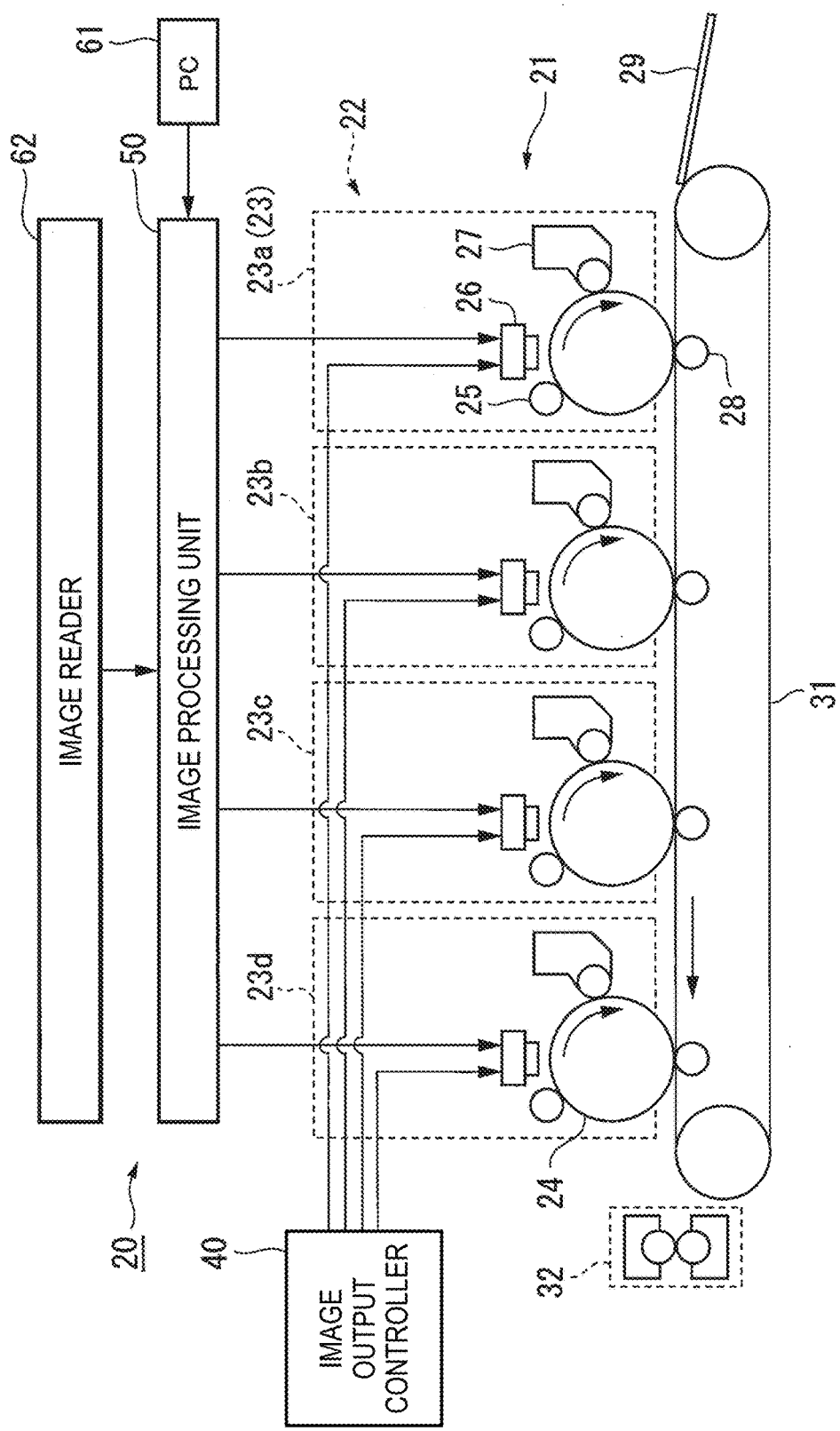
FIG. 2 is an explanatory diagram illustrating an overall configuration of an image forming apparatus according to a first exemplary embodiment.

FIG. 2 illustrates an overall configuration of an image forming apparatus according to a first exemplary embodiment.

In FIG. 2, the image forming apparatus 20 is an image forming apparatus generally called a tandem type. The image forming apparatus 20 includes an image forming process unit 21 that forms an image corresponding to image data of each color, an image output controller 40 that controls the image forming process unit 21, and an image processing unit 50 that is connected to, for example, a personal computer (PC) 61 or an image reader 62 and performs preset image processing on image data received from the personal computer (PC) 61 or the image reader 62.

The image forming process unit 21 includes image forming units 22 arranged in parallel at a regular interval. The image forming unit 22 includes four image forming engines 23 (23a to 23d) as an example of a toner image forming unit that forms toner images of four colors (yellow (Y), magenta (M), cyan (C), and black (K) in this case). Each of the image forming engines 23 (23a to 23d) includes, for example, a drum-shaped photoconductor 24 as an example of the image carrying unit that forms an electrostatic latent image and carries a toner image, a charger 25 that uniformly charges the surface of the photoconductor 24 at a preset potential, an optical writing device 26 that exposes the photoconductor 24 charged by the charger 25 to form an electrostatic latent image, and a developing unit 27 that develops the electrostatic latent image formed by the optical writing device 26. The image forming engines 23 (23a to 23d) form toner images of yellow (Y), magenta (M), cyan (C), and black (K), respectively.

In addition, in order to multiply transfer the toner images of the respective colors formed by the photoconductors 24 of the image forming engines 23 (23a to 23d) to a recording sheet 29 as an example of a recording medium, the image forming process unit 21 includes a sheet transport belt 31 that conveys the recording sheet, a transfer unit (a transfer roller is used in this case) 28 that transfers the toner images of the photoconductors 24 to the recording sheet, and a fixing device 32 that fixes the toner images onto the recording sheet.

In the image forming apparatus 20, the image forming process unit 21 performs an image forming operation based on various control signals supplied from the image output controller 40. Under the control of the image output controller 40, image data received from the personal computer (PC) 61 or the image reader 62 is subjected to image processing by the image processing unit 50 and supplied to the image forming engines 23. For example, in the image forming engine 23d for black (K), the photoconductor 24 is charged to a preset potential by the charger 25 while rotating in an arrow direction, and is exposed to light by the optical writing device 26 that emits light based on the image data supplied from the image processing unit 50. As a result, an electrostatic latent image related to a black (K) image is formed on the photoconductor 24. The electrostatic latent image formed on the photoconductor 24 is developed by the developing unit 27, and a black (K) toner image is formed on the photoconductor 24. Similarly, toner images of yellow (Y), magenta (M), and cyan (C) are formed in the image forming engines 23 (23a to 23c), respectively.

The toner images of the respective colors formed on the photoconductors 24 by the respective image forming engines 23 (23a to 23d) are sequentially electrostatically transferred to the recording sheet 29 supplied along with the movement of the sheet transport belt 31 moving along the arrow direction by a transfer electric field applied to the transfer unit 28 (transfer roller), and a composite toner image in which the toners of the respective colors are superimposed on the recording sheet 29 is formed.

Thereafter, the recording sheet 29 on which the composite toner image is electrostatically transferred is conveyed to the fixing device 32. The composite toner image on the recording sheet 29 conveyed to the fixing device 32 is fixed on the recording sheet 29 by being subjected to a fixing process by heat and pressure by the fixing device 32, and the recording sheet 29 is discharged from the image forming apparatus 20.

<Configuration Example of Optical Writing Device>

Figure 3:
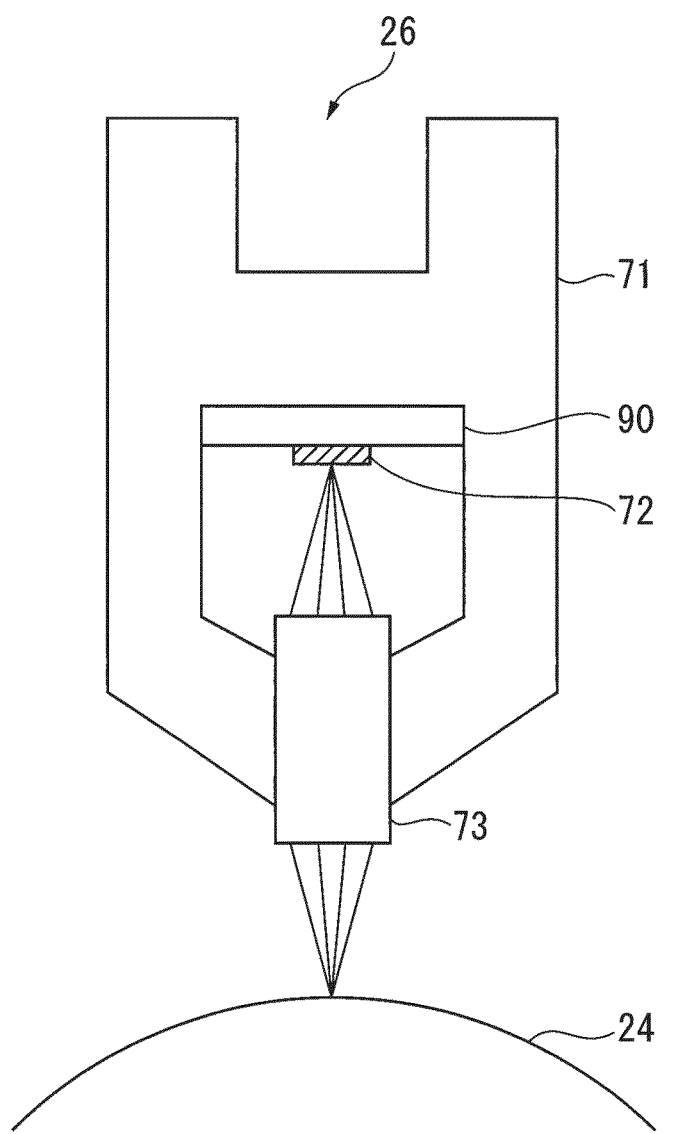
FIG. 3 is an explanatory diagram illustrating an example of an optical writing device to be used in the image forming apparatus according to the first exemplary embodiment.
Figure 4:
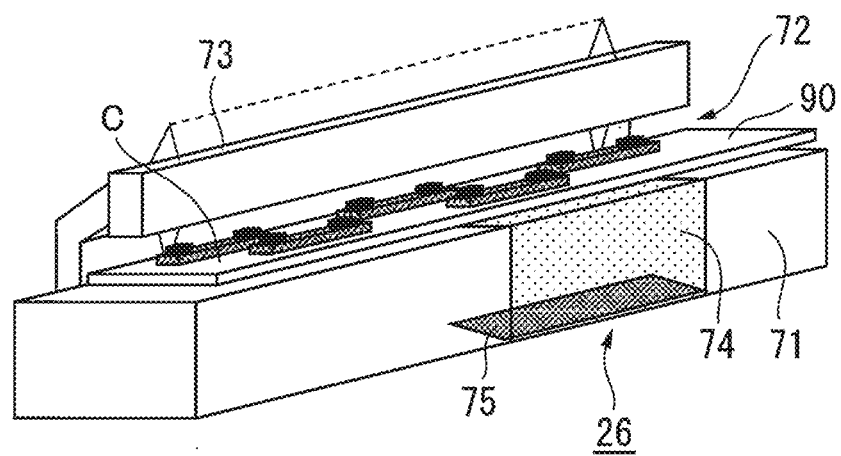
FIG. 4 is a perspective view illustrating a configuration example of the optical writing device illustrated in FIG. 3.

FIG. 3 illustrates a configuration example of the optical writing device 26 according to an exemplary embodiment, and FIG. 4 is a perspective view of the optical writing device 26.

In FIG. 3, the optical writing device 26 includes a device housing 71, a light emitting element array 72 that is held by the device housing 71 and includes plural LEDs as light emitting elements, and an imaging lens 73 that is held by the device housing 71 and serves as an example of an imaging unit that forms an image based on an optical output emitted from the light emitting elements of the light emitting element array 72 and exposes the photoconductor 24 to form an electrostatic latent image.

In the exemplary embodiment, the device housing 71 is formed of, for example, a metal, holds the light emitting element array 72 and the imaging lens 73, and is configured such that a light emitting point L of the light emitting element 80 of the light emitting element array 72 is aligned with a focal plane of the imaging lens 73. The imaging lens 73 is disposed along an axial direction (corresponding to the main scanning direction) of the photoconductor 24.

The light emitting element array 72 is connected to a control board 75 on which a signal generating circuit 76 (see FIG. 9A) is mounted via a flexible printed circuit 74.

<Configuration Example of Light Emitting Element Array>

Figure 5A:
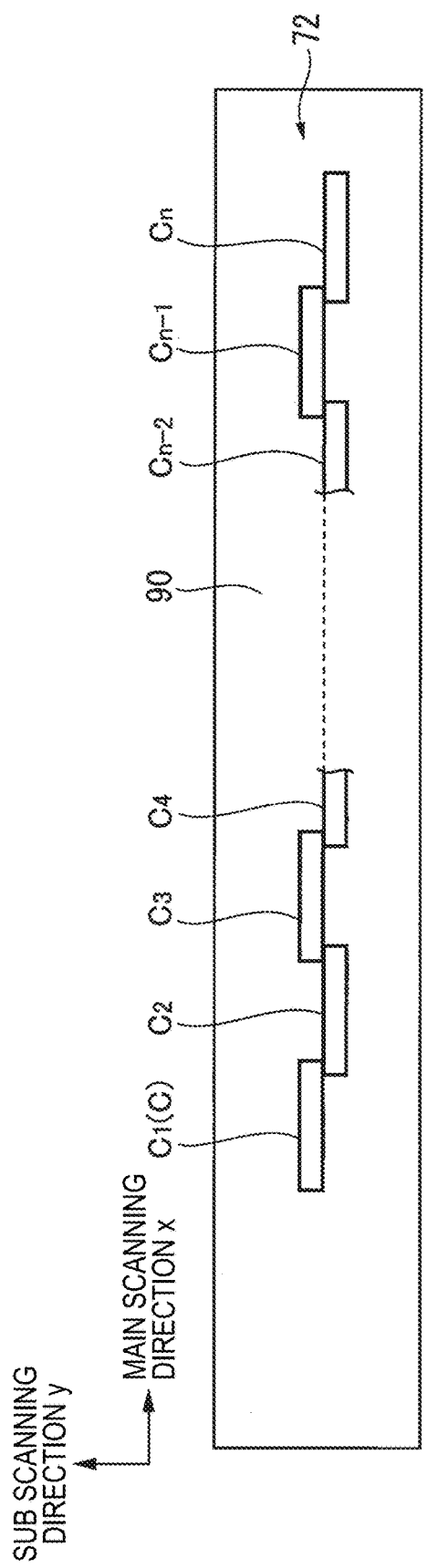
FIG. 5A is an explanatory diagram illustrating a light emitting element array to be used in the optical writing device.

FIG. 5A illustrates a configuration example of the light emitting element array 72.

In FIG. 5A, the light emitting element array 72 is configured such that plural light emitting element chips C (C1 to Cn) are arranged on a circuit board 90 in a staggered manner in two rows facing each other in the main scanning direction, the light emitting elements 80 are arranged side by side in the main scanning direction in each of the light emitting element chips C (C1 to Cn), and the signal generating circuit 76 mounted on the control board 75 and each of the light emitting elements 80 in the plural light emitting element chips C are directly connected to each other, so that light emission of each of the light emitting elements 80 is individually controlled by the signal generating circuit 76.

In a case where plural light emitting element chips C are arranged in one direction, the interval between the light emitting elements 80 adjacent to each other is not constant at end portions of the light emitting element chips C, but in the exemplary embodiment, this is prevented because the light emitting element chips C are arranged in a staggered manner.

(Light Emitting Element Chip)

Figure 5B:
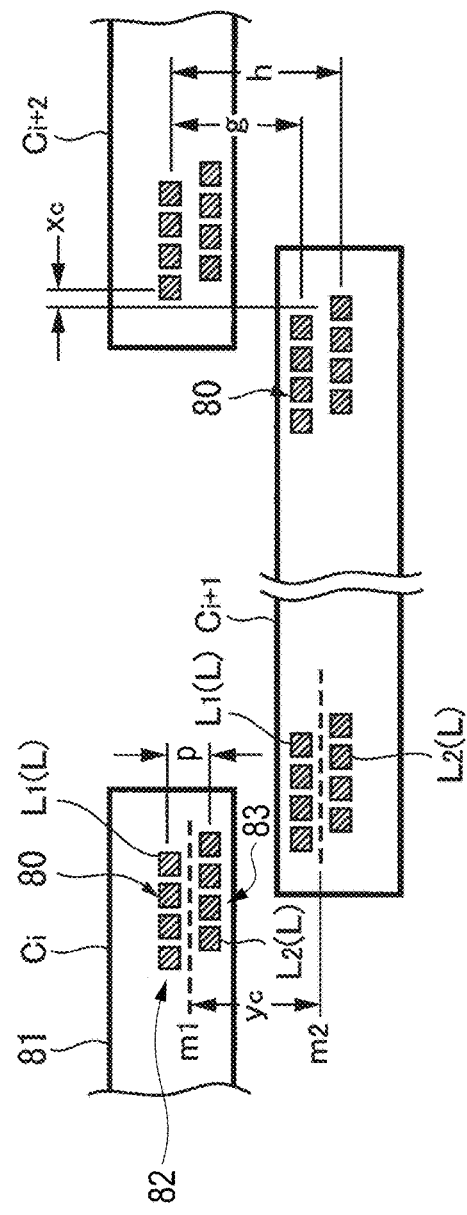
FIG. 5B is an explanatory diagram illustrating a configuration example of a light emitting chip to be used in the light emitting element array.

FIG. 5B illustrates a configuration example of the light emitting element chips C (Ci to Ci+2).

In FIG. 5B, among the light emitting element chips C mounted on the light emitting element array 72, an odd-numbered light emitting element chip C (Ci, and Ci+2: i being an odd number in this case) include a first light emitting element row 82 including the light emitting elements 80 arranged in the main scanning direction in an area close to an even-numbered light emitting element chip C (Ci+1: i being an odd number in this case) on a chip substrate 81, and a second light emitting element row 83 including the light emitting elements 80 arranged in the main scanning direction such that the second light emitting element row 83 is deviated from the first light emitting element row 82 in the sub scanning direction and each of the light emitting elements 80 in the second light emitting element row 83 is positioned between the light emitting elements 80 adjacent to each other in the first light emitting element row 82.

On the other hand, the even-numbered light emitting element chip C (Ci+1: i being an odd number in this case) includes a first light emitting element row 82 including the light emitting elements 80 arranged in the main scanning direction in an area close to the odd-numbered light emitting element chip C (Ci, and Ci+2: i being an odd number in this case) on the chip substrate 81, and a second light emitting element row 83 including the light emitting elements 80 arranged in the main scanning direction such that the second light emitting element row 83 is deviated from the first light emitting element row 82 in the sub scanning direction and each of the light emitting elements 80 in the second light emitting element row 83 is positioned between the light emitting elements 80 adjacent to each other in the first light emitting element row 82.

In the exemplary embodiment, when an arrangement pitch of the light emitting elements 80 in each of the first light emitting element row 82 and the second light emitting element row 83 in the main scanning direction (corresponding to a distance between center lines of the light emitting elements 80 adjacent to each other in the main scanning direction) is defined as P, an arrangement pitch along the main scanning direction between a light emitting element 80 of the first light emitting element row 82 and a light emitting element 80 of the second light emitting element row 83 adjacent to the light emitting element 80 of the first light emitting element row 82 is P/2.

Further, in the exemplary embodiment, a distance xc between a position of a center line in the main scanning direction of the light emitting element 80 positioned at the end (right end in the drawing) of the odd-numbered light emitting element chip C (for example, Ci) and a position of a center line in the main scanning direction of the light emitting element 80 positioned at the beginning (left end in the drawing) of the even-numbered light emitting element chip C (for example, Ci+1) adjacent thereto is set to be equal to the arrangement pitch P/2. Further, a distance xc between a position of a center line in the main scanning direction of the light emitting element 80 positioned at the beginning of the odd-numbered light emitting element chip C (for example, Ci+2) and a position of a center line in the main scanning direction of the light emitting element 80 positioned at the end of the even-numbered light emitting element chip C (for example, Ci+1) adjacent thereto is also set to be equal to the arrangement pitch P/2.

When a centroid position of the light emitting point L connecting center positions in the sub scanning direction between the first light emitting element row 82 and the second light emitting element row 83 of the odd-numbered light emitting element chip C (Ci, and Ci+2) is defined as m1, and a centroid position of the light emitting point L connecting center positions in the sub scanning direction between the first light emitting element row 82 and the second light emitting element row 83 of the even-numbered light emitting element chip C (Ci+1) is defined as m2, a deviation distance yc in the sub scanning direction between the light emitting element chips C adjacent to each other is set to |m1−m2|.

<Arrangement Example of Light Emitting Elements of First Light Emitting Element Row and Second Light Emitting Element Row>

For describing an arrangement example of the light emitting elements 80 of the first light emitting element row 82 and second light emitting element row 83, first, a case where the arrangement pitch is narrowed in an arrangement example of light emitting elements of a light emitting element array according to a first comparative embodiment will be described.

First Comparative Embodiment

Figure 6A:
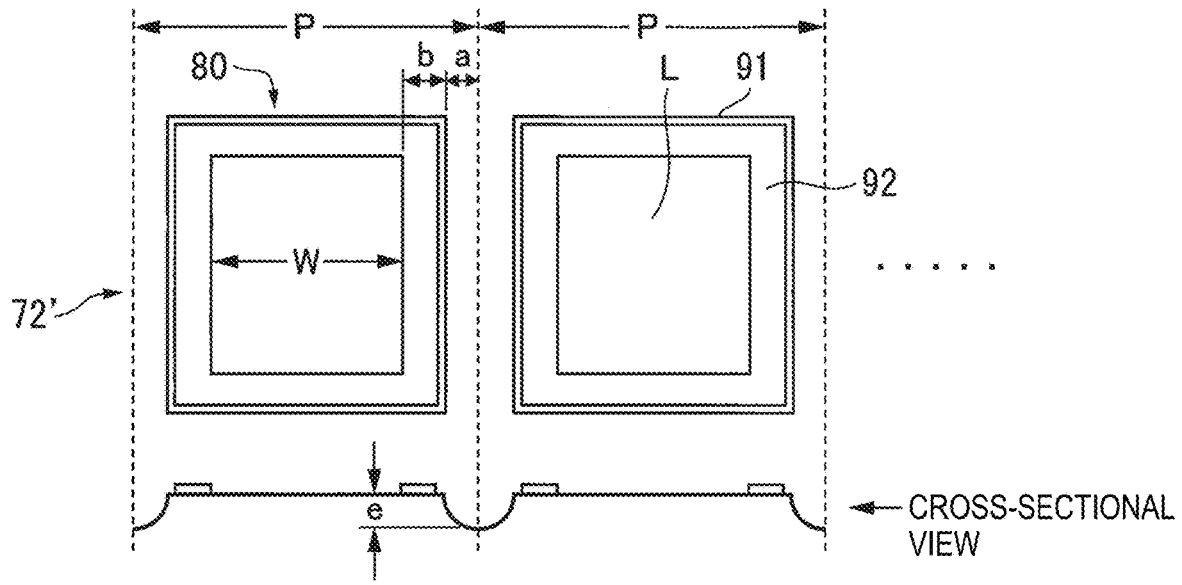
FIG. 6A is an explanatory diagram illustrating a configuration example of a light emitting chip of a light emitting element array used in a first comparative embodiment.

In a light emitting element array 72' according to the first comparative embodiment, for example, even if the light emitting element chips are arranged in a staggered manner, as illustrated in FIG. 6A, the light emitting elements 80 are arranged in one row at the arrangement pitch P in the main scanning direction in each light emitting element chip.

In this case, the light emitting points L of the light emitting elements 80 are arranged in the main scanning direction x at an arrangement pitch P being an equal interval. Here, in order to separate light emitting portion islands 91 corresponding to the light emitting point areas of the light emitting elements 80 adjacent to each other, a width 2a is set, and in a case where the light emitting elements 80 adjacent to each other are separated by wet etching, when an etching depth is set to "e", "a" is larger than "e" (i.e. "a>e"). Further, in this case, an electrode 92 through which light does not pass is disposed on the surface of the light emitting element 80. Since the light emission under the electrode 92 is not extracted, a width 2b for the electrode 92 is ensured as a non-light emitting area. Therefore, it is understood that, of the area of the light emitting portion island 91 of the light emitting element 80, an area W (corresponding to the light emitting beam area) in which light may actually be emitted is "P-2a-2b".

In the case of 1200 dpi (dots per inch), W=21.2−4−5=12.2 μm, where P=21.2 μm, a=2 μm, and b=2.5 μm.

Figure 6B:
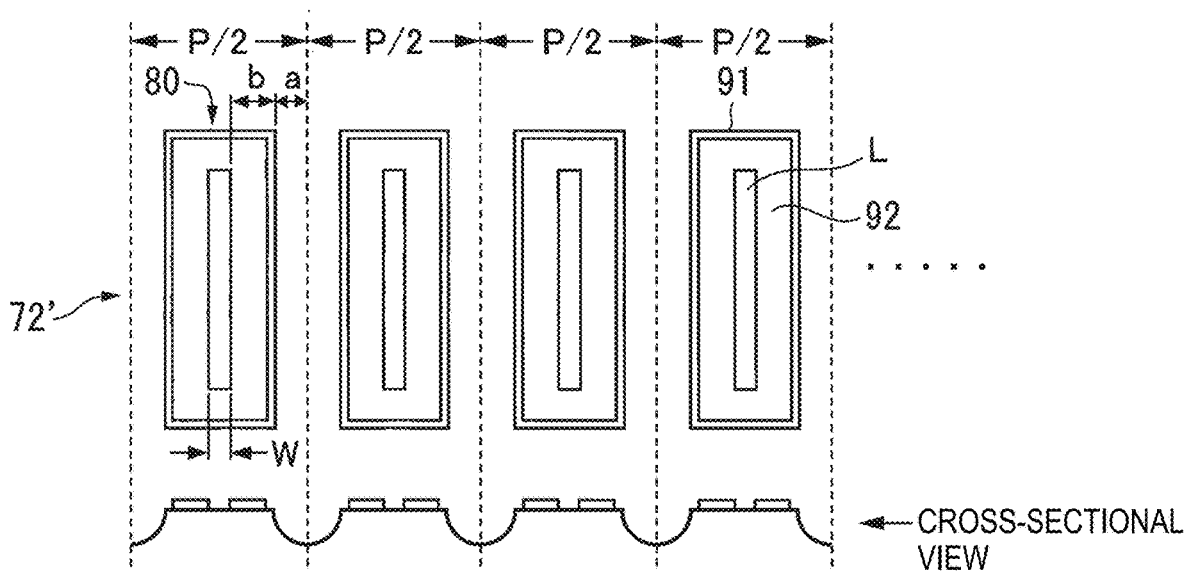
FIG. 6B is an explanatory diagram illustrating a configuration example of a light emitting chip of a light emitting element array used in the first comparative embodiment, in which an arrangement pitch of light emitting element rows of a light emitting chip is narrower than that of light emitting element rows of the light emitting chip illustrated in FIG. 6A.

Next, in the light emitting element array 72' according to the first comparative embodiment, assuming that the arrangement pitch between the light emitting elements 80 is P/2 (corresponding to 2400 dpi), as illustrated in FIG. 6B, P/2=10.6 μm, and therefore, when the width 2a for separation of the light emitting portion islands 91 and the width 2b for the electrode 92 are subtracted, a width dimension of the area W (light emitting beam area) where light is actually emitted within the light emitting point L is calculated as follows: 10.6−4−5=1.6 μm. As described above, the width dimension of the area W where light is actually emitted within the light emitting point L is reduced to 1.6/12.2=1/7.6 as compared with the case illustrated in FIG. 6A. In this case, the ratio of hiding area for the electrode 92 to the light emitting portion island 91 also increases, and the light emission efficiency decreases. Therefore, the current density increases due to the increase in current and the decrease in light emitting area caused by the decrease in light emission efficiency, which leads to a factor of accelerating the deterioration of the light emitting element 80, and the reliability of the light emitting element 80 decreases.

Figure 7A:
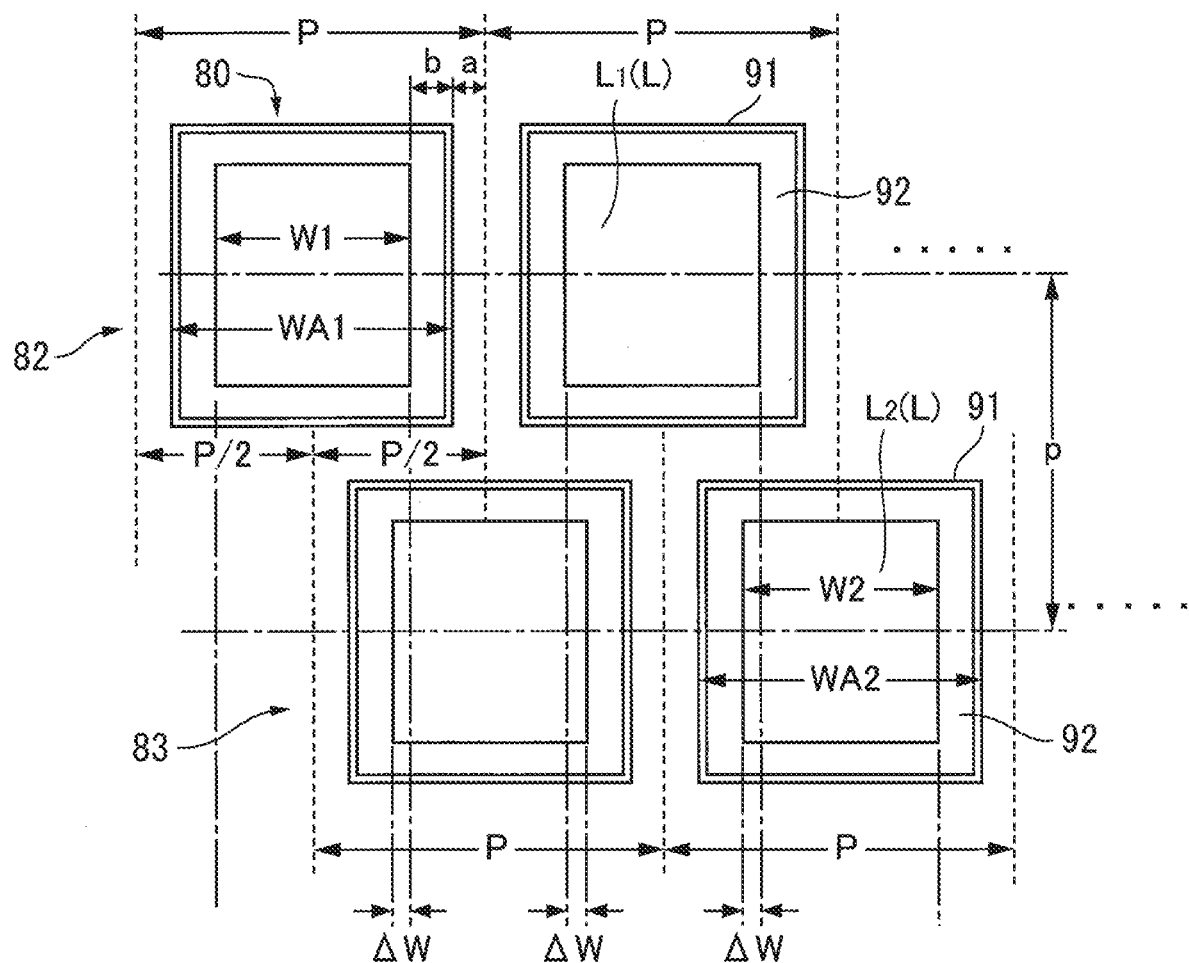
FIG. 7A is an explanatory diagram illustrating a part of light emitting elements in FIG. 5B.
Figure 7B:
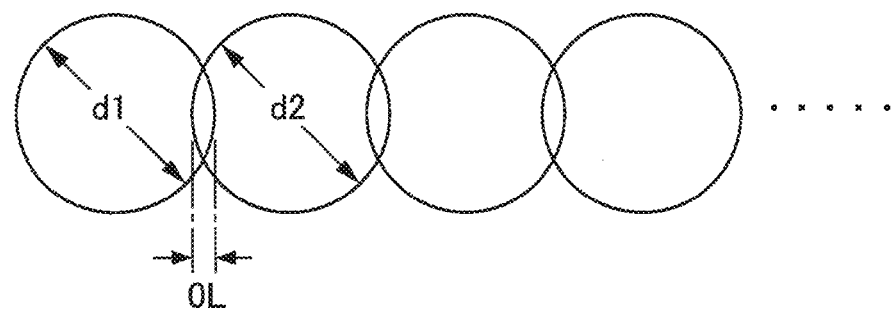
FIG. 7B is an explanatory diagram schematically illustrating beams emitted from light emitting elements.

In contrast, in the exemplary embodiment, as illustrated in FIG. 7A, each light-emitting element chip C includes the first light emitting element row 82 and the second light emitting element row 83, and the arrangement pitch of the light emitting elements 80 in each of the first light emitting element row 82 and the second light emitting element row 83 along the main scanning direction is P.

The arrangement pitch along the main scanning direction between the light emitting element 80 of the first light emitting element row 82 and the adjacent light emitting element 80 of the second light emitting element row 83 is P/2, and the distance (in this case, the distance between the positions of the center lines in the sub scanning direction of the light emitting elements 80) p between the light emitting elements 80 of the first light emitting element row 82 and the light emitting elements 80 of the second light emitting element row 83 along the sub scanning direction is set to an integer N times the line interval.

Further, in the exemplary embodiment, of the light emitting points L (L1 and L2) of the respective light emitting elements 80 of the first light emitting element row 82 and second light emitting element row 83, the areas where light is actually emitted are ensured to the same extent as the light emitting element array 72' used in the first comparative embodiment. That is, in the light emitting points L (L1 and L2), an area surrounded by the electrode 92 is the light emitting beam area W in the exemplary embodiment (specifically, W1 and W2, and in the exemplary embodiment, W1=W2).

In the exemplary embodiment, the light emitting beam area W1 of each light emitting element 80 of the first light emitting element row 82 and the light emitting beam area W2 of each light emitting element 80 of the second light emitting element row 83 are arranged such that there is no gap between them in the main scanning direction.

The light emitting beam area W1 of the light emitting point L (L1) of the light emitting element 80 of the first light emitting element row 82 is set so as to overlap with the light emitting beam area W2 of the light emitting point L of the light emitting element 80 of the second light emitting element row 83 by ΔW in the main scanning direction. In the exemplary embodiment, ΔW is set to be, for example, 0.05% of the light emitting beam area W (W1 or W2) of the light emitting point L. Here, when ΔW is a negative value being smaller than 0, overlap in the main scanning direction between the light emitting point L in the first light emitting element row 82 and the adjacent light emitting point L in the second light emitting element row 83 is likely to be unstable, and when ΔW exceeds 10% of W, light emitted from the light emitting points L is excessively overlapped with each other, and there is a concern that the resolution in units of the light emitting point L is likely to be affected.

Therefore, in the exemplary embodiment, diameters d (specifically, d1 and d2) of beams schematically indicated by circles for the light emitted from the light emitting points L in the first light emitting element row 82 and the light emitted from the adjacent light emitting points L in the second light emitting element row 83 are overlapped with each other by an area OL substantially corresponding to the overlap ΔW of the light emitting points L in the main scanning direction.

The light emitting element 80 in the first light emitting element row 82 and the adjacent light emitting element 80 in the second light emitting element row 83 are separated from each other by p in the sub scanning direction. In order to form an image arranged in a straight line on the photoconductor 24, the image may be drawn using an image forming timing or delay circuit, each shifted by N lines.

(Example of Sectional Structure of Light Emitting Element Chip)

Figure 8:
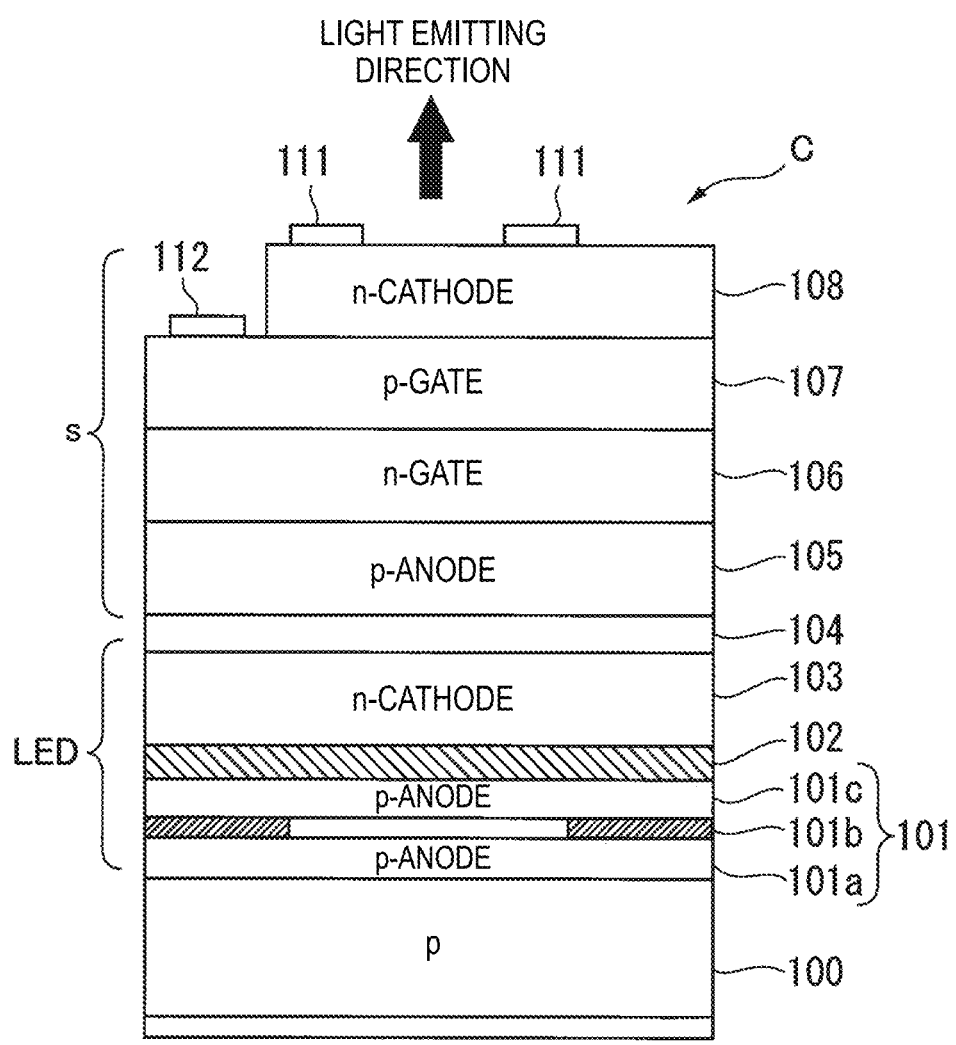
FIG. 8 is an explanatory diagram illustrating a configuration example of a light emitting element used in the first exemplary embodiment.

In the exemplary embodiment, as illustrated in FIG. 8, a self scanning light emitting diode (SLED) is used as the light emitting element chip C, and a p-anode layer 101, a light emitting layer 102, and an n-cathode layer 103 each constituting a light emitting diode LED are stacked on or above a p-type substrate 100, grooves are formed in a layer where the light emitting elements 80 are stacked so as to form different light emitting points, and a tunnel junction layer 104 is formed thereon, and a p-anode layer 105, an n-gate layer 106, a p-gate layer 107, and an n-cathode layer 108 each constituting a setting thyristor S are stacked on or above the tunnel junction layer 104.

In the setting thyristor S, an n-ohmic electrode 111 provided on the n-cathode layer 108 is used as a cathode electrode, and a p-type ohmic electrode 112 provided on the p-gate layer 107 exposed by removing the n-cathode layer is used as a gate electrode. The p-anode layer 101 includes a lower p-anode layer 101a, a current confinement layer 101b, and an upper p-anode layer 101c.

In the exemplary embodiment, the light emitting point areas WA1 and WA2 have the same width as the n-cathode layer 103 of the light emitting diode LED. In other words, the light emitting point areas WA1 and WA2 are constituted such that light is emitted over the entire width of the n-cathode layer 103 corresponding to an outer peripheral portion of each light emitting element 80, and the width of the n-cathode layer 103 is regarded as the width of the light emitting point areas WA1 and WA2. The present invention is not limited thereto, and, for example, the light emitting point areas WA1 and WA2 may be configured such that the narrower area may be formed by the current confinement layer 101b and light is emitted from only the central portion of the light emitting element 80.

In addition, the light emitting diode LED emits light in a direction orthogonal to the substrate 100 as indicated by the arrow. Therefore, it may be used for the case where the light emitted in the direction orthogonal to the substrate 100 is used. Since a center portion of the n-ohmic electrode 111 is an opening, light passes through the tunnel junction layer 104 and is emitted.

A current confinement layer may be provided in the p-anode layer 105 of the setting thyristor S, or a current confinement layer may be provided in the n-cathode layer 103 of the light emitting diode LED and the n-cathode layer 108 of the setting thyristor S.

As described above, in the exemplary embodiment, the light emitting beam areas W (W1 and W2) of the light emitting point L of the light emitting element 80 are determined by a width dimension of the current confinement layer 101b or a diameter of the opening of the n-ohmic electrode 111 in the light emitting direction.

(Wiring Structure to Light Emitting Element)

Figure 9A:
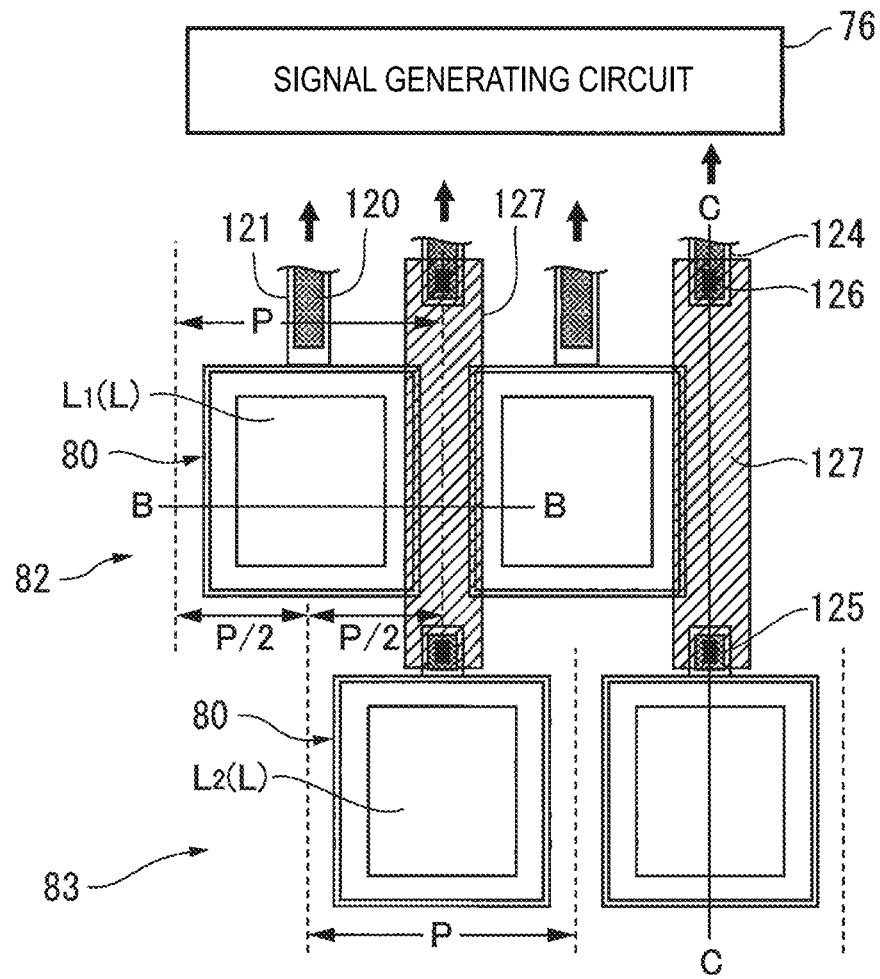
FIG. 9A is an explanatory diagram illustrating an example of a wiring structure of the light emitting element used in the first exemplary embodiment.

In the exemplary embodiment, as illustrated in FIG. 9A, gate electrodes 120 for supplying a light emission start signal from the signal generating circuit 76 are connected to the light emitting points L (specifically, L1 and L2) of the light emitting elements 80 of the first light emitting element row 82 and second light emitting element row 83, respectively.

Here, the light emitting point L (specifically, L1) of the light emitting element 80 of the first light emitting element row 82 is connected via the gate electrode 120 on a gate semiconductor layer 121.

Further, the gate electrode is wired such that the light emitting point L (specifically, L2) of the light emitting element 80 of the second light emitting element row 83 passes through the area between the light emitting elements 80 adjacent to each other in the first light emitting element row 82. However, similarly to the first light emitting element row 82, when the gate electrode is wired between each of the light emitting elements 80, there is a concern that the gate electrode may be contact with the light emitting elements 80 of the first light emitting element row 82.

Figure 9B:
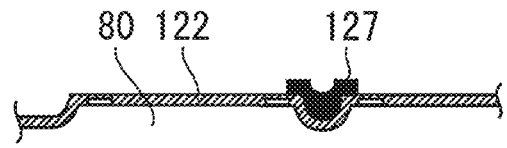
FIG. 9B is a cross-sectional explanatory view taken along line B-B in FIG. 9A.
Figure 9C:
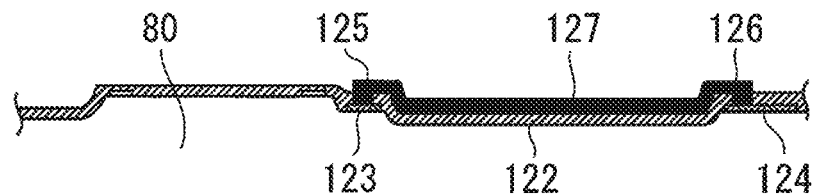
FIG. 9C is a cross-sectional explanatory view taken along line C-C in FIG. 9A.

Therefore, in the exemplary embodiment, as illustrated in FIGS. 9B and 9C, the light emitting elements 80 of the first light emitting element row 82 and the areas between each of the light emitting elements 80 are covered with a transmissive insulating film 122 (for example, silicon), and an electrode terminal 123 connected to the light emitting points L (specifically, L2) of the light emitting elements 80 of the second light emitting element row 83 is provided below the insulating film 122. As for the insulating film 122, a divided gate electrode 124 divided by the areas between the light emitting elements 80 adjacent to each other in the first light emitting element row 82 is provided, and contact holes 125 and 126 are provided at respective end portions of the electrode terminal 123 and the divided gate electrode 124 on the light emitting element 80 side. A metal wiring 127 is laid between the contact holes 125 and 126 on the insulating film 122, and the metal wiring 127 is connected to the electrode terminal 123 and the divided gate electrode 124 through the contact holes 125 and 126.

In the exemplary embodiment, a wiring structure for each light emitting element 80 of the second light emitting element row 83 may be provided without narrowing the width dimension of the light emitting point areas of the light emitting points L (L1 and L2) of each light emitting element 80 of the first light emitting element row 82 and second light emitting element row 83.

<Drive Control of Light Emitting Element Array>

Figure 10:
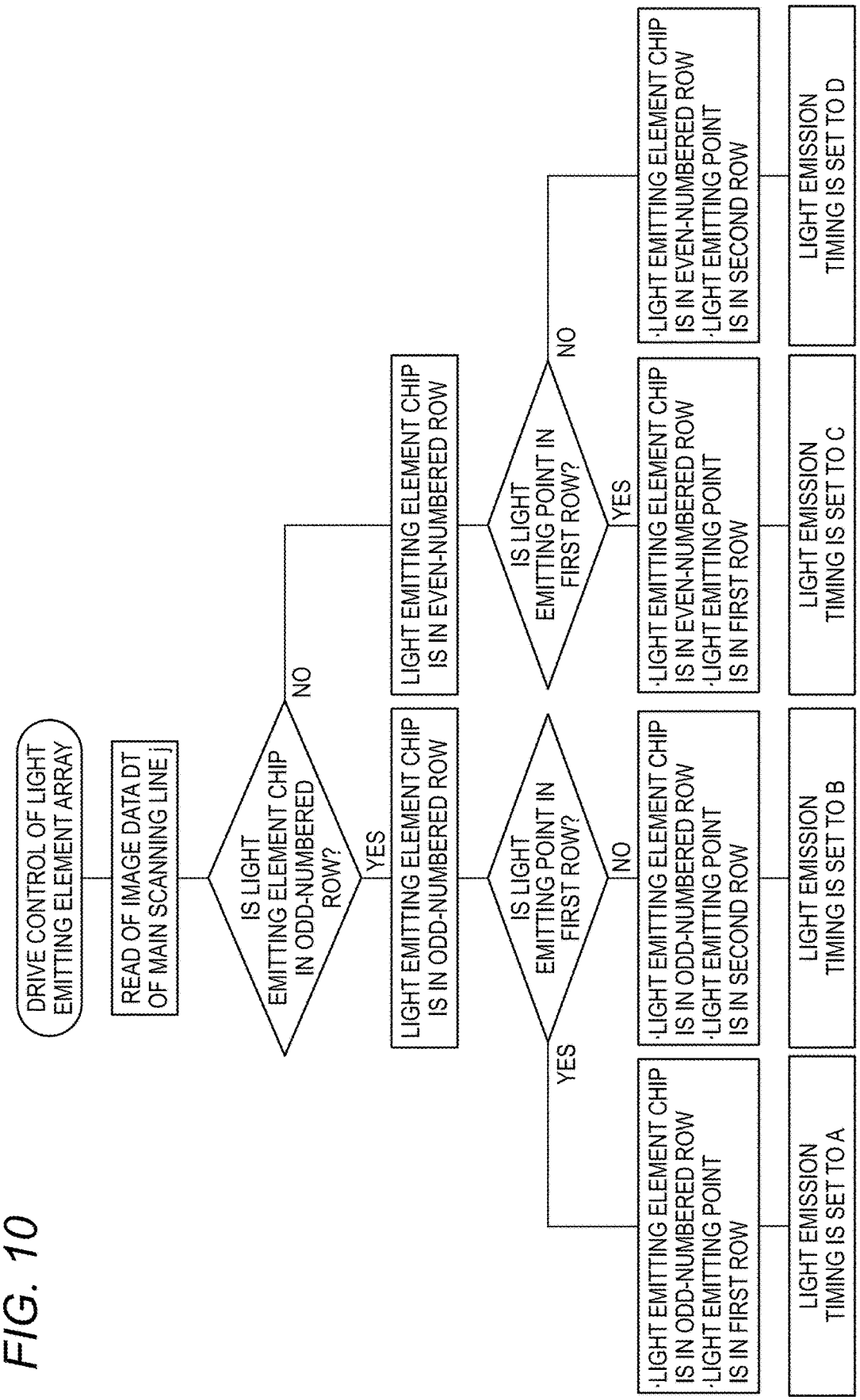
FIG. 10 is a flowchart illustrating an example of drive control of the light emitting element array.
Figure 11A:
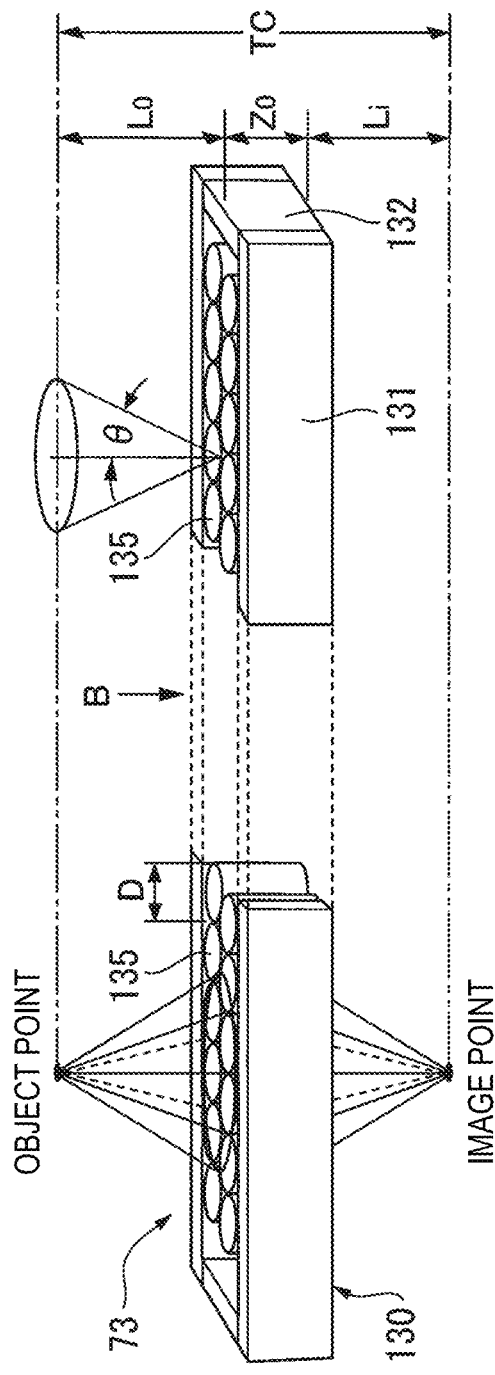
FIG. 11A is an explanatory view illustrating a configuration example of an imaging lens of the optical writing device used in the first exemplary embodiment.
Figure 11B:
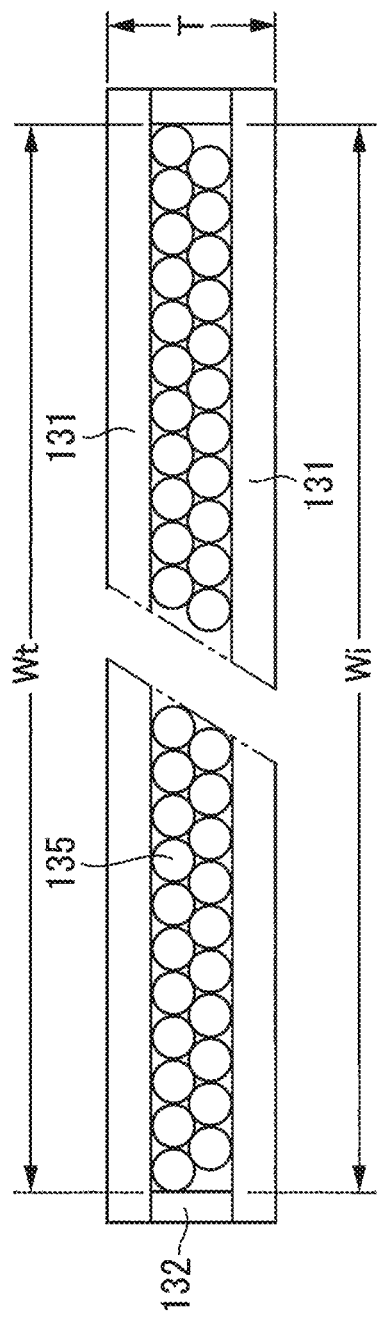
FIG. 11B is a view seen from a direction of the arrow B in FIG. 11A.

FIG. 10 illustrates a flowchart for the drive control of the light emitting element array in the exemplary embodiment.

First, image data DT of a main scanning line j is read into the signal generating circuit 76 of the control board 75. The image data DT is a signal start signal provided to each light emitting element 80 of each light emitting element chip C of the light emitting element array 72.

First, it is determined whether or not the light emitting element chip C is in an odd-numbered row, and then it is determined whether or not the light emitting point L of the light emitting element 80 is in the first row (first light emitting element row 82). As a result, the image data DT from the signal generating circuit 76 is supplied to the light emitting elements 80 divided into the following four sections:

(1) the light emitting element chip C is in an odd-numbered row, and the light emitting point is in the first row;
(2) the light emitting element chip C is in an odd-numbered row, and the light emitting point is in the second row;
(3) the light emitting element chip C is in an even-numbered row, and the light emitting point is in the first row; and
(4) the light emitting element chip C is in an even-numbered row, and the light emitting point is in the second row.

Here, in the case (1), as illustrated in FIG. 5B, the light emitting points L1, as targets, of the light emitting elements 80 in the first row of the odd-numbered light emitting element chip C are driven, and a light emission timing is set to A.

In the case (2), as illustrated in FIG. 5B, the light emitting points L2, as targets, of the light emitting elements 80 in the second row of the odd-numbered light emitting element chip C are driven, and a light emission timing is set to B. In the setting of B in the exemplary embodiment, with respect to the setting of A, the light emission timing may be adjusted in consideration of the distance p (integer N times of the line distance) in the sub scanning direction between the light emitting element 80 of the first light emitting element row 82 and the adjacent light emitting element 80 of the second light emitting element row 83.

Further, in the case (3), as illustrated in FIG. 5B, the light emitting points L1, as targets, of the light emitting elements 80 in the first row of the even-numbered light emitting element chip C are driven, and a light emission timing is set to C. In the setting of C in the exemplary embodiment, with respect to the setting of A, the light emission timing may be adjusted in consideration of a distance g (corresponding to yc in FIG. 5B) in the sub scanning direction between the light emitting elements 80 in the first row of the odd-numbered light emitting element chip C and the light emitting elements 80 in the first row of the even-numbered light emitting element chip C.

Further, in the case (4), as illustrated in FIG. 5B, the light emitting points L2, as targets, of the light emitting elements 80 in the second row of the even-numbered light emitting element chip C are driven, and a light emission timing is set to D. In the setting of D in the exemplary embodiment, with respect to the setting of A, the light emission timing may be adjusted in consideration of a distance h in the sub scanning direction between the light emitting elements 80 in the first row of the odd-numbered light emitting element chip C and the light emitting elements 80 in the second row of the even-numbered light emitting element chip C.

<Imaging Lens>

In the exemplary embodiment, as illustrated in FIGS. 3, 4, 11A, and 11B, in the imaging lens 73, a lens holder 130 is formed by a pair of side plates 131 extending along the axial direction of the photoconductor 24 and block plates 132 that block both ends between the side plates 131, and cylindrical gradient index lenses 135 extending from the light emitting element array 72 side to the photoconductor 24 side are arranged in two rows adjacent to each other along the axial direction of the photoconductor 24 (corresponding to the main scanning direction) to form an array in the space of the lens holder 130. A peripheral wall of the gradient index lens 135 is covered with a protective layer made of a resin or the like. The number of rows of the gradient index lenses 135 is not limited to two, and may be three or more, or may be just one.

In the exemplary embodiment, the gradient index lens 135 has a conjugate length TC between a light emitting point L (corresponding to an object point) of the light emitting element array 72 and an image point on the photoconductor 24. The light emitted from the light emitting point L enters the gradient index lens 135, passes through the inside of the lens due to the refractive index distribution, and is emitted therefrom to converge to the image point.

In the exemplary embodiment, the gradient index lens 135 has a length Z0, a distance from the gradient index lens 135 to the light emitting point L is L0, a distance from the gradient index lens 135 to the image point is Li, and a lens diameter D is set to be a value (for example, 40 μm to 45 μm) that is at least four times a beam diameter d (for example, 10 μm) of the light emitting point L.

In addition, in the imaging lens 73, a lens array in which the gradient index lenses 135 are arranged in two rows has a full width Wt, and the full width Wt is set to be equal to or greater than an image effective width Wi.

<Relation Between Light Emitting Point and Image Point>

Figure 12:
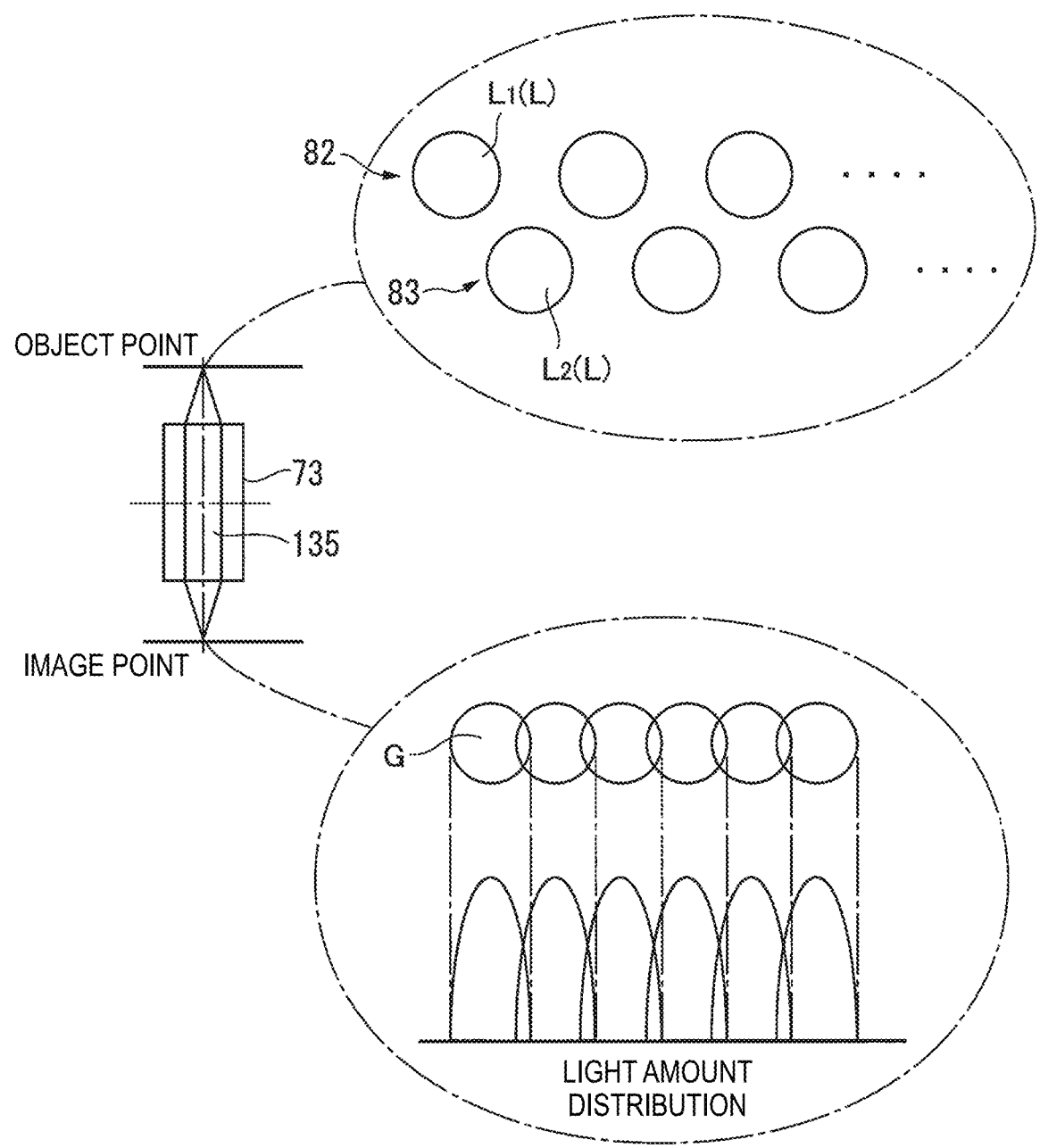
FIG. 12 is an explanatory diagram schematically illustrating an object point (a light emitting point of a light emitting element) and an image point (an image formed by the imaging lens) in the optical writing device used in the first exemplary embodiment.

In the exemplary embodiment, as illustrated in FIG. 12, the light emitting points L (specifically, L1 and L2) of the respective light emitting elements 80 of the light emitting element array 72 emit light at an arrangement pitch P/2 along the main scanning direction between the light emitting element 80 of the first light emitting element row 82 and the adjacent light emitting element 80 of the second light emitting element row 83.

In this state, an image based on the light emitted from the light emitting points L is formed on the photoconductor 24 via the imaging lens 73.

In this case, when the light emitting element array 72 draws an image (linear image) based on linear light extending in the main scanning direction, as illustrated in FIG. 12, an image G formed on the photoconductor 24 is formed with dots at the arrangement pitch being P/2, but the images G formed in a dot shape are overlapped with each other at adjacent positions. In this state, the images G formed in a dot shape are drawn with substantially the same overlap degree as the overlap of the beam diameters d of the light emitting points L of the light emitting element array 72 in the main scanning direction, and the light amount distribution of the images G formed in a dot shape is increased by the overlap of the images G formed in a dot shape.

In the exemplary embodiment, P is, for example, 1200 dpi, and P/2 is 2400 dpi.

<Quality of Formed Image>

First Exemplary Embodiment

In the first exemplary embodiment, an image based on light emitted from light emitting points L (L1 and L2) adjacent to each other is formed on the photoconductor 24 via the imaging lens 73.

Figure 13A:
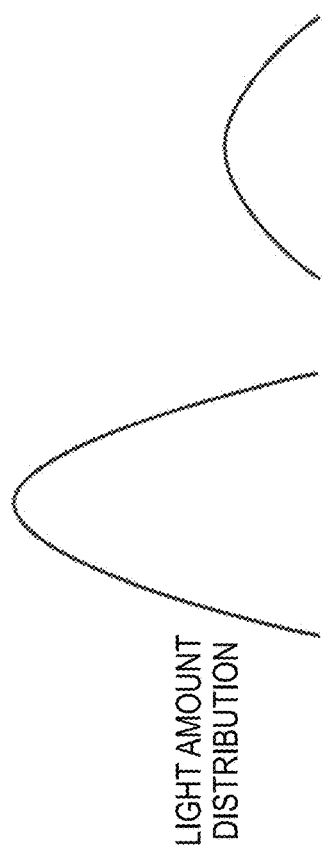
FIG. 13A is an explanatory diagram illustrating an example of an image formed by the optical writing device used in the first exemplary embodiment.

In this case, as illustrated in FIG. 13A, the images G that are formed in a dot shape and are adjacent to each other, corresponding to the light emitting points L (L1 and L2) adjacent to each other, are drawn such that the imaged beam areas are partially overlapped with each other, and the light amount distribution of the images G formed in a dot shape increases, and a normal density image is drawn.

Assuming that the light emission characteristics in a part of the light emitting points L vary, as illustrated in FIG. 13A, for the variation in the light emission characteristics of one light emitting point L, the light amount is increased due to the overlap of images G formed by the adjacent light emitting point L having the normal light emission characteristics. Thus the quality of the formed images G corresponding to the light emitting points L having the variation in the light emission characteristics is corrected to some extent.

First Comparative Embodiment

Figure 13B:
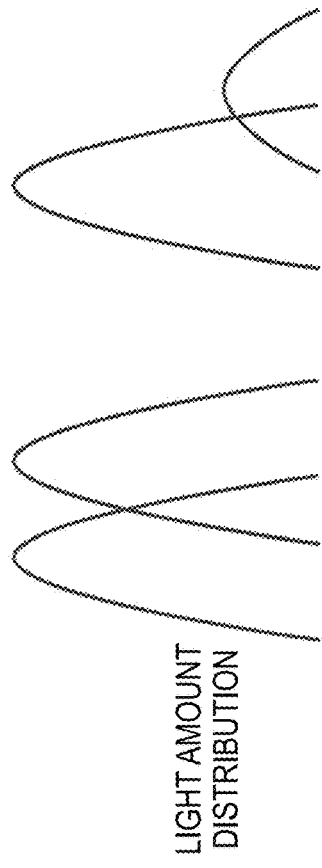
FIG. 13B is an explanatory diagram illustrating an example of an image formed by an optical writing device used in the first comparative embodiment.

On the other hand, when the light emitting element array according to the first comparative embodiment (see FIGS. 6A and 6B) is used, since the beam diameters of the light emitting points L adjacent to each other in the main scanning direction are not overlapped with each other, a formed image G corresponding to a light emitting point L directly depends on the light emission characteristics of the light emitting point. That is, when the light emission characteristics of the light emitting points L are normal, as illustrated in FIG. 13B, a normal density image is drawn for the image G formed in a dot shape. However, when the light emission characteristics of the light emitting points L vary, as illustrated in FIG. 13B, there is a concern that the light amount distribution of the image G formed in a dot shape may be insufficient and, for example, sufficient image density may not be obtained.

(Influence Due to Layout of Imaging Lens)

Assuming that the imaging lens 73 is disposed at an ideal position, in both the first exemplary embodiment and the first comparative embodiment, when a linear image extending in the main scanning direction is drawn by the light emitting element array 72, light emitted from the light emitting point L of the light emitting element array 72 enters the gradient index lenses 135 constituting the imaging lens 73 along a center position in an arrangement direction of the gradient index lenses 135.

Figure 14A:
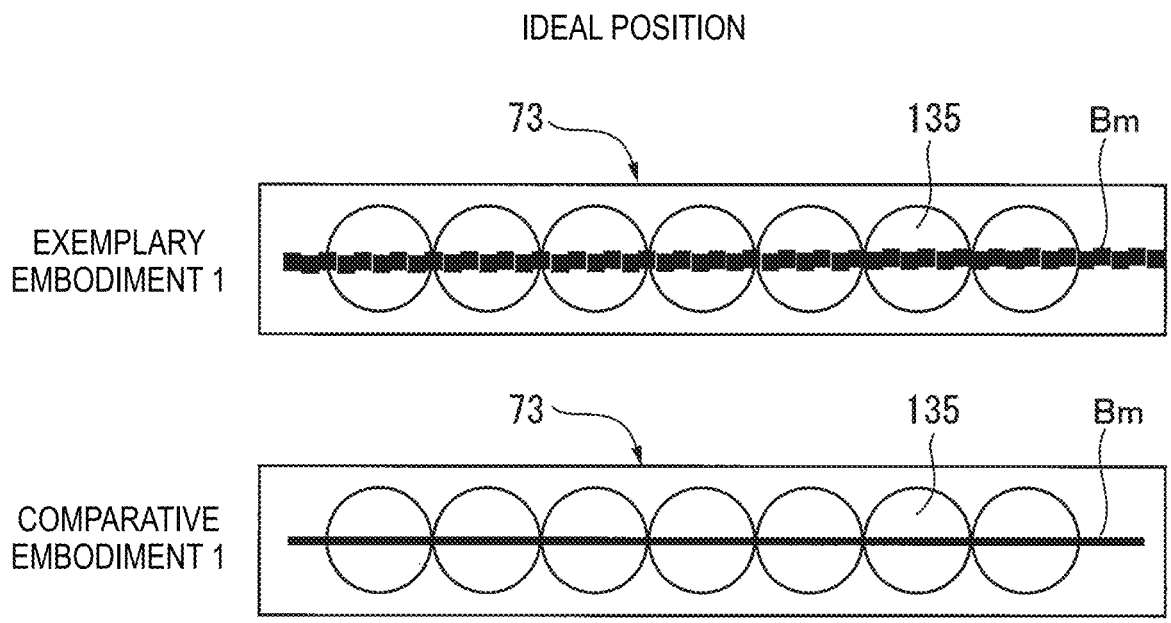
FIG. 14A is an explanatory diagram illustrating incident states of light emitted from the light emitting element array according to the first exemplary embodiment and from the light emitting element array according to the first comparative embodiment in a case where the imaging lens is disposed at an ideal position.

In this case, in the first exemplary embodiment, the light emitting element array 72 writes an optical image by the light emitting points L arranged at the arrangement pitch P in the first light emitting element row 82 and the second light emitting element row 83, and draws the optical image at the arrangement pitch being substantially P/2 with respect to the main scanning direction. Therefore, as illustrated in FIG. 14A, the optical image with a large light amount is formed on the photoconductor 24 side by partially overlapping the diameters of beams emitted from the light emitting points L while ensuring a large light emitting area of the light emitting points L.

In the light emitting element array according to the first comparative embodiment, as illustrated in FIG. 6B, when the light emitting points L are arranged at the arrangement pitch P/2, a light emitting area of the light emitting points L is small, and the amount of light emitted from the light emitting points L is also small.

(Collapse and Deviation of Imaging Lens)

In addition, when the imaging lens 73 is disposed, the imaging lens 73 may be inclined or may be offset.

Figure 14B:
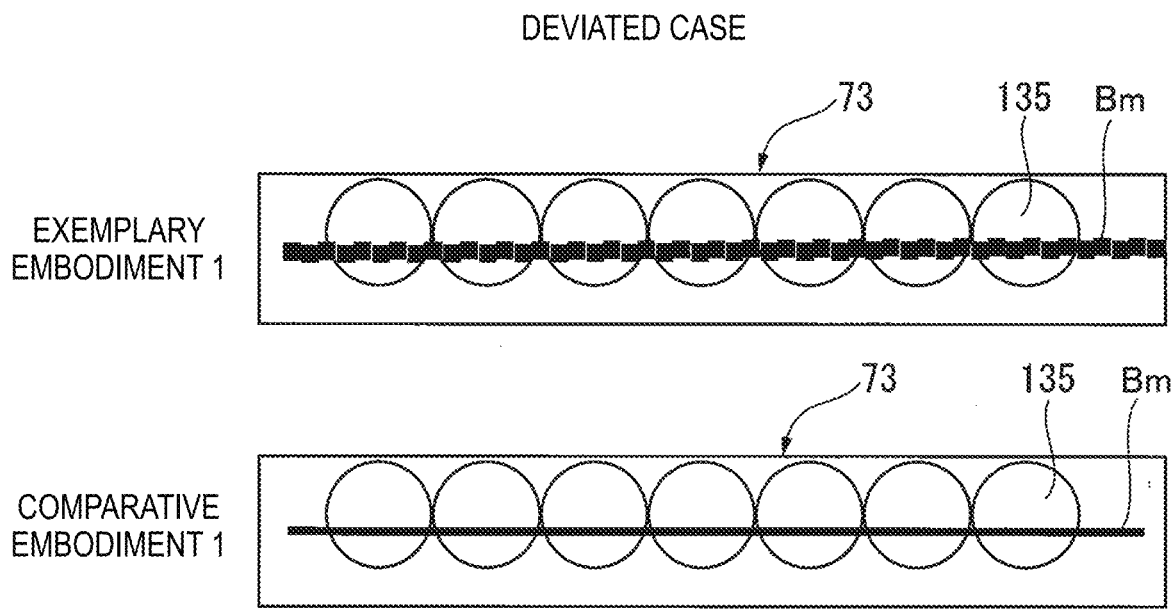
FIG. 14B is an explanatory diagram illustrating incident states of light emitted from the light emitting element array according to the first exemplary embodiment and from the light emitting element array according to the first comparative embodiment in a case where the imaging lens is deviated from the ideal position.

In such a case, as illustrated in FIG. 14B, the light emitted from the light emitting point L of the light emitting element array 72 enters the gradient index lenses 135 at a position deviated from the center line in the arrangement direction of the gradient index lenses 135.

In this case, in the light emitting element array 72 according to the first exemplary embodiment, the optical image with a large light amount may be formed on the photoconductor 24 side by partially overlapping the diameters of the beams emitted from the light emitting points L while ensuing a large light emitting area of the light emitting points L. Therefore, even if the light amount to be picked up is slightly reduced due to an inclination θ or offset of the imaging lens 73, the light amount to be picked up is compensated by the increase in light amount due to the overlap of the beam diameters, so that the reduction in light amount of the optical image is alleviated.

In this regard, in the light emitting element array according to the first comparative embodiment, since there is no compensation for the light amount unlike the first exemplary embodiment, if the light amount to be picked up is reduced due to the inclination or offset of the imaging lens 73, there is a concern that the quality of the formed image may be directly affected.

(Exemplary Embodiment of Incident on Imaging Lens by Light Emitting Element Chips Arranged in Staggered Manner)

In the exemplary embodiment, in the light emitting element array 72, the plural light emitting element chips C are arranged in a staggered manner, and the first light emitting element row 82 and the second light emitting element row 83 are arranged in the main scanning direction at the arrangement pitch P in each light emitting element chip C. The light emitting point L of the light emitting elements 80 of the first light emitting element row 82 and the adjacent light emitting point L of the light emitting elements 80 of the second light emitting element row 83 are arranged at the arrangement pitch of P/2 in the main scanning direction, and the diameters of beams emitted from the light emitting points L are partially overlapped with each other.

Figure 15A:
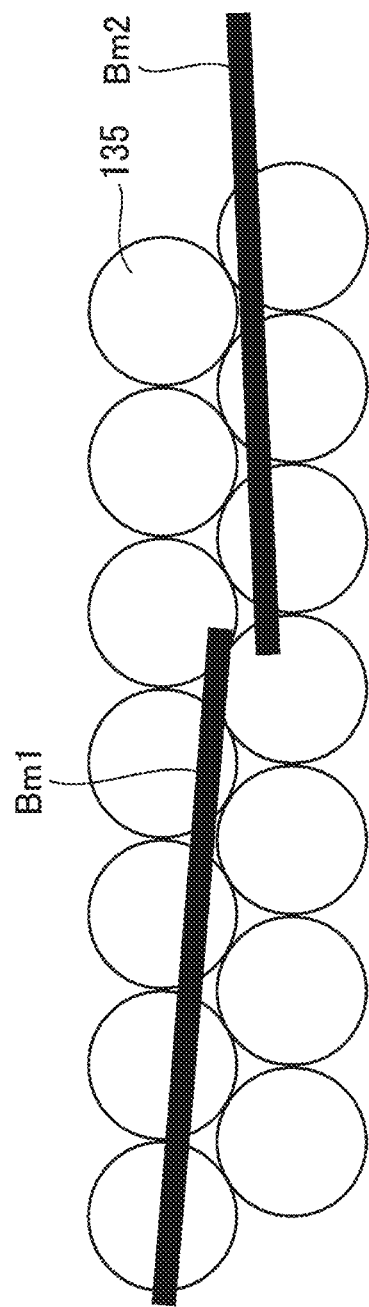
FIG. 15A is an explanatory diagram illustrating an incident state of light emitted from disposed light emitting chips deviated from each other to the imaging lens in the light emitting element array used in the first exemplary embodiment.

Therefore, in the exemplary embodiment, as illustrated in FIG. 15A, the light Bm1 emitted from a light emitting point L of an odd-numbered light emitting element chip C among the light emitting element chips C passes through the gradient index lens 135 in the first row, and the light Bm2 emitted from a light emitting point L of an even-numbered light emitting element chip C passes through the gradient index lens 135 in the second row.

Figure 15B:
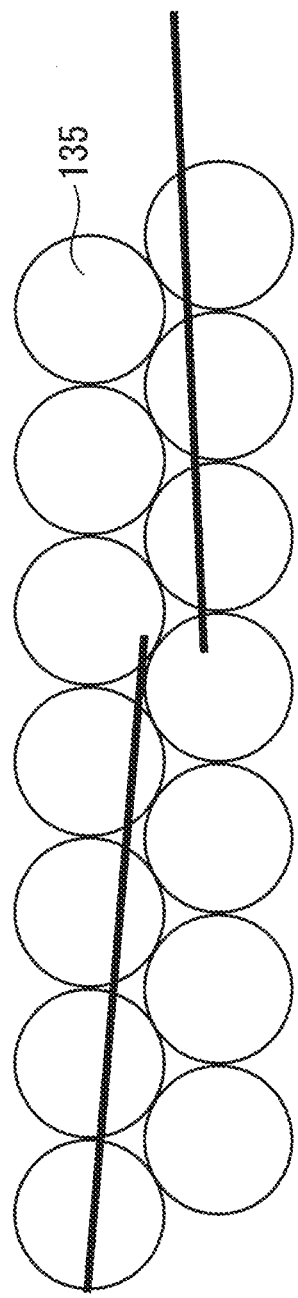
FIG. 15B is an explanatory diagram illustrating an incident state of light emitted from disposed light emitting chips deviated from each other to the imaging lens in the light emitting element array used in the first comparative embodiment.

In this way, the light emitted from the light emitting element chips C arranged in a staggered manner is distributed and enters the gradient index lenses 135 each in the first and second rows. An amount of incident light at this time is larger than that in the case of the light emitting element array according to the first comparative embodiment (see FIG. 15B) because the diameters of beams from the light emitting points L are partially overlapped with each other.

Even when the imaging lens 73 is inclined or offset, the lens diameter D of the gradient index lens 135 is sufficiently larger than the beam diameter, so that the light emitted from the light emitting element chips C arranged in a staggered manner is distributed and enters the gradient index lenses 135 each in the first and second rows, and the imaging characteristics by the imaging lens 73 may be obtained.

(First Modification)

Figure 16:
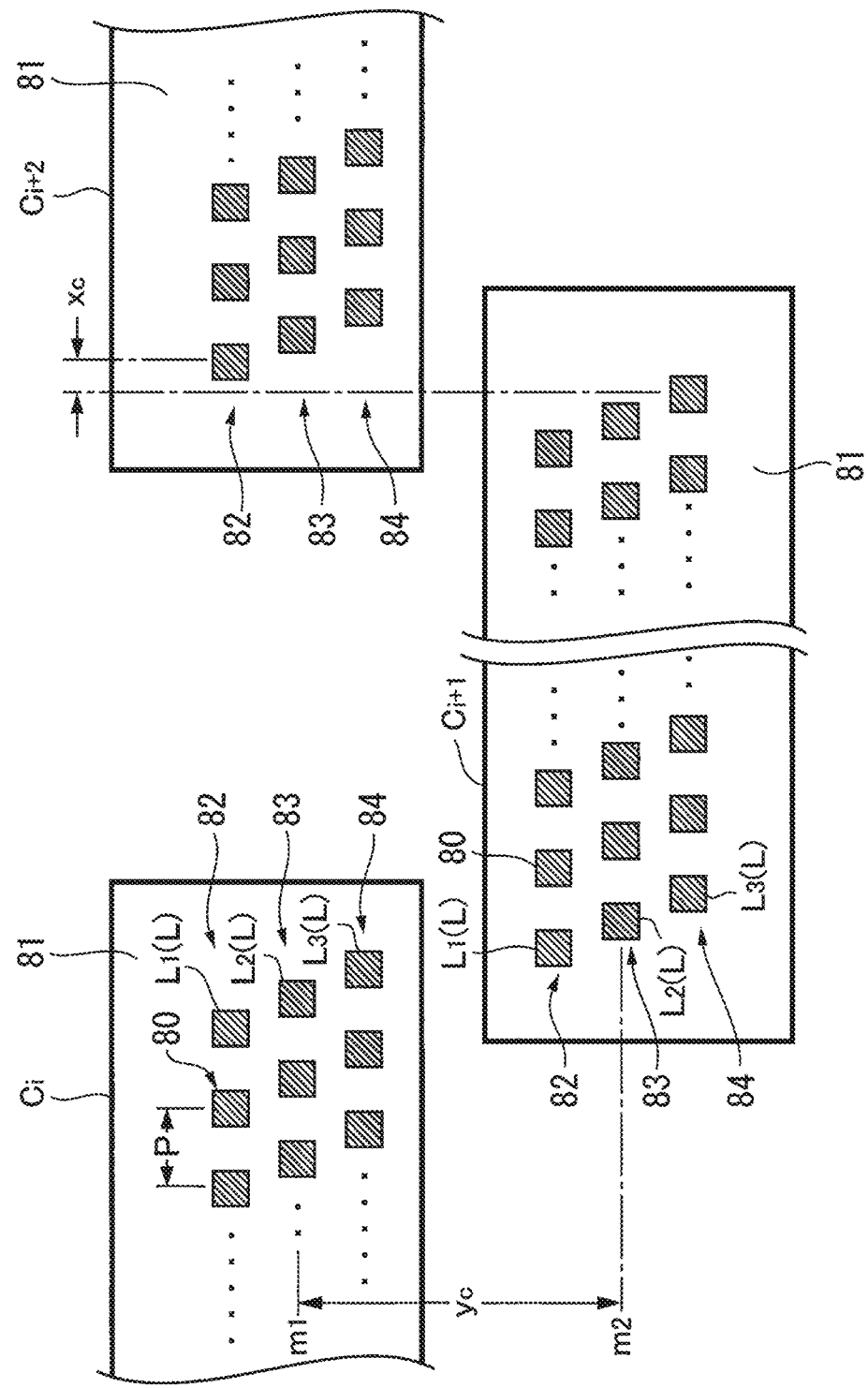
FIG. 16 is an explanatory diagram illustrating a light emitting element array used in a first modification.

FIG. 16 illustrates a light emitting element array according to a first modification.

In FIG. 16, the light emitting element array 72 includes plural light emitting element chips C arranged in a staggered manner as in the first exemplary embodiment, but each light emitting element chip C includes a first light emitting element row 82, a second light emitting element row 83, and a third light emitting element row 84, unlike the first exemplary embodiment.

In this modification, the odd-numbered light emitting element chips C (Ci and Ci+2: i being an odd number) include a first light emitting element row 82, a second light emitting element row 83, and a third light emitting element row 84 in this order from a position away from an even-numbered light emitting element chip C (Ci+1: i being an odd number) toward a position close to the even-numbered light emitting element chip C.

In this modification, the first to third light emitting element rows 82, 83, and 84 are each formed by arranging the light emitting elements 80 at the arrangement pitch P along the main scanning direction.

In addition, the light emitting element 80 of the first light emitting element row 82 and the adjacent light emitting element 80 of the second light emitting element row 83 are arranged at the arrangement pitch P/3 in the main scanning direction, and the light emitting element 80 of the second light emitting element row 83 and the adjacent light emitting element 80 of the third light emitting element row 84 are arranged at the arrangement pitch P/3 in the main scanning direction.

Further, the light emitting point L (specifically L1) of the light emitting element 80 of the first light emitting element row 82 and the light emitting point L (specifically L2) of the light emitting element 80 of the second light emitting element row 83 are arranged so as to be partially overlapped with each other in the main scanning direction, and the light emitting point L (specifically L2) of the light emitting element 80 of the second light emitting element row 83 and the light emitting point L (specifically L3) of the light emitting element 80 of the third light emitting element row 84 are arranged so as to be partially overlapped with each other in the main scanning direction.

Further, the first to third light emitting element rows 82, 83, and 84 are arranged at an interval being an integer N times the line interval in the sub scanning direction.

Further, the even-numbered light emitting element chip C (Ci+1: i being an odd number) includes a first light emitting element row 82, a second light emitting element row 83, and a third light emitting element row 84 in this order from a position close to the odd-numbered light emitting element chips C (Ci and Ci+2: i being an odd number) toward a position away from the odd-numbered light emitting element chips C.

Here, the configurations of the first to third light emitting element rows 82, 83, and 84 are substantially the same as those of the odd-numbered light emitting element chips C.

In FIG. 16, xc indicates a distance between a position of a center line in the main scanning direction of the light emitting element 80 positioned at the beginning of the odd-numbered light emitting element chip C (for example, Ci+2) and a position of a center line in the main scanning direction of the light emitting element 80 positioned at the end of the adjacent even-numbered light emitting element chip C (for example, Ci+1), and xc is set to be equal to the arrangement pitch P/3 in this modification.

Further, when a centroid position of the light emitting point L connecting center positions in the sub scanning direction of the second light emitting element row 83 of the odd-numbered light emitting element chip C (Ci and Ci+2) is m1, and a centroid position of the light emitting point L connecting center positions in the sub scanning direction of the second light emitting element row 83 of the even-numbered light emitting element chip C (Ci+1) is m2, a deviated distance yc in the sub scanning direction of the light emitting element chips C adjacent to each other is set as |m1−m2|.

According to the exemplary embodiment, in each of the light emitting element chips C of the light emitting element array 72, the light emitting element rows 82 to 84 (i.e. three rows) are provided, and the first light emitting element row 82 is distributed into the first, fourth, seventh, . . . light emitting points L (specifically, L1), the second light emitting element row 83 is distributed into the second, fifth, eighth, . . . light emitting points L (specifically, L2), and the third light emitting element row 84 is distributed into the third, sixth, ninth, . . . light emitting points L (specifically, L3).

Therefore, in the exemplary embodiment, in each of the light emitting element chips C, the light emission timing of the light emitting points L of the light emitting element rows 82 to 84 (i.e. three rows) may be adjusted so as to form an image on the photoconductor 24.

In particular, in the exemplary embodiment, when P is 800 dpi, P/3=2400 dpi, and therefore, an image of 2400 dpi may be formed in the same manner as in the first exemplary embodiment.

In the exemplary embodiment, the light emitting element chip C includes the light emitting element rows 82 to 84 (i.e. three rows), but the present invention is not limited thereto, and for example, at least four rows of light emitting element rows may be used.

EXAMPLES

Example 1

In this example, the image forming apparatus according to the first exemplary embodiment is embodied, and a light amount profile of the light emitting element array of the optical writing device and a print sample are collected.

Figure 17A:
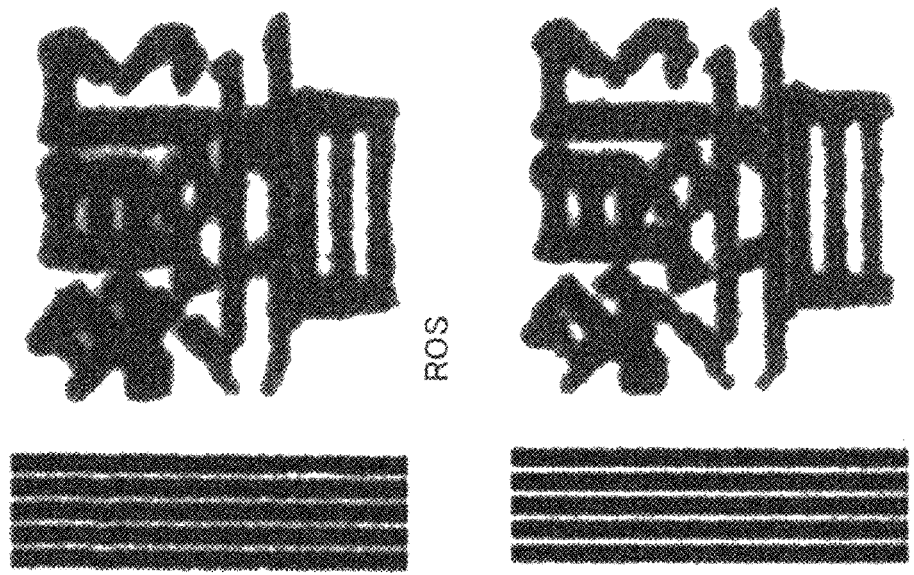
FIG. 17A is an explanatory diagram illustrating a light amount profile when an image of 2400 dpi is formed on a photoconductor using an optical writing device according to Example 1.

FIG. 17A illustrates a light amount distribution of the light emitting element array of the optical writing device (denoted by LPH in the drawing) in Example 1.

In FIG. 17A, the luminance of a beam emitted from the light emitting point of the light emitting element of the light emitting element array is illustrated.

Here, for comparison, the above light amount profile is compared with the light amount profile by a surface emitting laser (denoted by ROS in the drawing), and it is confirmed that the light amount distribution of the light emitting element array in Example 1 is large.

FIG. 17A illustrates the light amount distribution in the sub scanning direction, and substantially the same tendency is observed also in the main scanning direction.

Figure 17B:
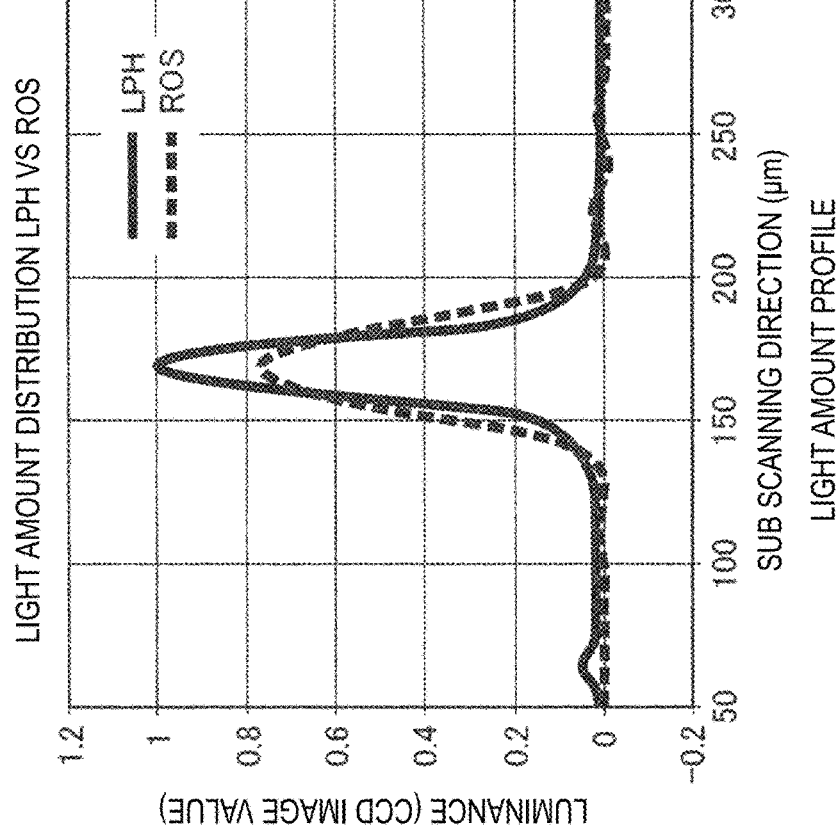
FIG. 17B is an explanatory diagram illustrating an enlarged photograph of a print sample.

In addition, as illustrated in FIG. 17B, when a print sample of the character of 2400 dpi is collected, reproduction of a high-definition image is confirmed. Here, as an evaluation condition, at the time of best focus, the ladder is 600 dpi/2on2off, and the character is 4 pt in MS Mincho. For comparison, when a print sample using a surface emitting laser is collected, the print sample in Example 1 is finer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A light emitting component comprising:
    a first light emitting element row including light emitting elements arranged in a main scanning direction; and
    a second light emitting element row including light emitting elements arranged in the main scanning direction such that the second light emitting element row is deviated from the first light emitting element row in a sub scanning direction and each of the light emitting elements in the second light emitting element row is positioned between light emitting elements adjacent to each other in the first light emitting element row,
    wherein a light emitting point area that is an area where each light emitting element of the first light emitting element row emits light, and a light emitting point area that is an area where each light emitting element of the second light emitting element row emits light are overlapped with each other in the main scanning direction,
    wherein an arrangement pitch along the main scanning direction between a light emitting point of each light emitting element of the first light emitting element row and a light emitting point of each light emitting element of the second light emitting element row is equal to or less than ½ of an arrangement pitch in the main scanning direction between light emitting points of the light emitting elements adjacent to each other in each of the first light emitting element row and the second light emitting element row, and
    wherein a light emitting beam area of a light emitting element of the first light emitting element row and an adjacent light emitting beam area of a light emitting element of the second light emitting element row are overlapped with each other in a range of 0% to 10% in the main scanning direction.

2. The light emitting component according to claim 1, wherein a light emitting point area of a light emitting element of the first light emitting element row and an adjacent light emitting point area of a light emitting element of the second light emitting element row are overlapped with each other in a range of 30% to 70% in the main scanning direction.

3. An optical writing device comprising:
the light emitting component according to claim 2; and
an imaging unit configured to form an image based on light emitted from each of the light emitting elements in the light emitting component on an image carrying unit configured to carry an image based on light,
wherein the optical writing device is configured to write an image based on light on the image carrying unit.

4. The light emitting component according to claim 1, wherein an arrangement pitch along the sub scanning direction between the light emitting point of the each light emitting element of the first light emitting element row and the light emitting point of the each light emitting element of the second light emitting element row is an integer N times an image forming line interval.

5. An optical writing device comprising:
the light emitting component according to claim 1; and
an imaging unit configured to form an image based on light emitted from each of the light emitting elements in the light emitting component on an image carrying unit configured to carry an image based on light,
wherein the optical writing device is configured to write an image based on light on the image carrying unit.

6. The optical writing device according to claim 5, wherein the imaging unit is configured such that gradient index lenses each having a diameter larger than a distance in the sub scanning direction between the first light emitting element row and the second light emitting element row are arranged in the main scanning direction.

7. The optical writing device according to claim 6, wherein a position where light emitted from the first light emitting element row enters the gradient index lens is different from a position where light emitted from the second light emitting element row enters the gradient index lens in the sub scanning direction.

8. The optical writing device according to claim 7, comprising:
a plurality of light emitting element chips each including the first light emitting element row and the second light emitting element row,
wherein the plurality of light emitting element chips are disposed such that each of the plurality of light emitting element chips is deviated from each other in the sub scanning direction and the main scanning direction,
the imaging unit is configured such that the gradient index lenses are arranged in a plurality of rows adjacent to each other in the main scanning direction, and
light from each light emitting element in one light emitting element chip enters gradient index lenses in a row arranged in the main scanning direction, and light from each light emitting element in an adjacent light emitting element chip enters gradient index lenses in a different row.

9. An image forming apparatus comprising:
the optical writing device according to claim 5; and
an image carrying unit that faces the optical writing device and is configured to carry an image based on light written by the optical writing device.

10. The image forming apparatus according to claim 9, wherein the optical writing device is arranged such that imaged beam areas corresponding to light emitting points adjacent to each other in the main scanning direction are overlapped with each other when a linear image along the main scanning direction is written on the image carrying unit by light emitted from each of the light emitting elements of the first light emitting element row and second light emitting element row.

11. A light emitting component comprising:
a first light emitting element row including light emitting elements arranged in a main scanning direction; and
a second light emitting element row including light emitting elements arranged in the main scanning direction such that the second light emitting element row is deviated from the first light emitting element row in a sub scanning direction and each of the light emitting elements in the second light emitting element row is positioned between light emitting elements adjacent to each other in the first light emitting element row,
wherein there is no gap in the main scanning direction between a light emitting beam area from which light emitted from each light emitting element of the first light emitting element row is emitted toward an object and a light emitting beam area from which light emitted from each light emitting element of the second light emitting element row is emitted toward the object,
wherein an arrangement pitch along the main scanning direction between a light emitting point of each light emitting element of the first light emitting element row and a light emitting point of each light emitting element of the second light emitting element row is equal to or less than ½ of an arrangement pitch in the main scanning direction between light emitting points of the light emitting elements adjacent to each other in each of the first light emitting element row and the second light emitting element row, and
wherein a light emitting beam area of a light emitting element of the first light emitting element row and an adjacent light emitting beam area of a light emitting element of the second light emitting element row are overlapped with each other in a range of 0% to 10% in the main scanning direction.

12. The light emitting component according to claim 11, wherein a light emitting point area of a light emitting element of the first light emitting element row and an adjacent light emitting point area of a light emitting element of the second light emitting element row are overlapped with each other in a range of 30% to 70% in the main scanning direction.

13. The light emitting component according to claim 11, wherein an arrangement pitch along the sub scanning direction between the light emitting point of the each light emitting element of the first light emitting element row and the light emitting point of the each light emitting element of the second light emitting element row is an integer N times an image forming line interval.

14. An optical writing device comprising:
the light emitting component according to claim 11; and
an imaging unit configured to form an image based on light emitted from each of the light emitting elements in the light emitting component on an image carrying unit configured to carry an image based on light,
wherein the optical writing device is configured to write an image based on light on the image carrying unit.

* * * * *